(12) United States Patent
Gray et al.

(10) Patent No.: US 11,777,884 B2
(45) Date of Patent: Oct. 3, 2023

(54) CONVERTING LINKS AND STATIC DATA INTO COLLABORATIVE USER EXPERIENCES

(71) Applicant: Microsoft Technology Licensing, LLC, Redmond, WA (US)

(72) Inventors: Leeviana Peng Gray, Bellevue, WA (US); Sebastien Rene Vandenberghe, Var (FR); Kyle P. Curlett, Seattle, WA (US); Yan Zhong Leigh, Kirkland, WA (US); Brian D. Meersma, Redmond, WA (US); Benjamin G. Wilde, Quincy, MA (US); Natalie Ann Mionis, Cambridge, MA (US); Sophia Isabel Vennix, Seattle, WA (US); Christopher Andrews Jung, Seattle, WA (US); Humberto Lezama Guadarrama, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 17/100,596

(22) Filed: Nov. 20, 2020

(65) Prior Publication Data
US 2022/0166738 A1     May 26, 2022

(51) Int. Cl.
*H04L 51/18*     (2022.01)
*G06N 20/00*     (2019.01)
(Continued)

(52) U.S. Cl.
CPC ............ *H04L 51/18* (2013.01); *G06F 3/0481* (2013.01); *G06F 3/04842* (2013.01);
(Continued)

(58) Field of Classification Search
CPC .... G06F 3/0481; G06F 3/04842; G06F 40/30; G06N 5/04; G06N 20/00; H04L 51/18; H04L 51/08; G06Q 10/10; G06Q 10/101
See application file for complete search history.

(56) References Cited

U.S. PATENT DOCUMENTS

| | | | |
|---|---|---|---|
| 7,647,373 | B2 | 1/2010 | Johnson et al. |
| 8,583,738 | B2 | 11/2013 | Zuckerberg et al. |

(Continued)

OTHER PUBLICATIONS

"International Search Report and Written Opinion Issued in PCT Application No. PCT/US21/052493", dated Jan. 13, 2022, 10 Pages.
(Continued)

*Primary Examiner* — Soe Hlaing

(57) ABSTRACT

Traditional messaging applications (such as email, social networking platforms, text, instant messaging, chat, etc.) are ill-equipped for collaboration. For instance, a sender and recipients corresponding regarding a topic are often required to exchange multiple messages. As a result, determining a consensus regarding the topic or summarizing the collaboration is difficult and cumbersome. Moreover, when links are included in messages, recipients are required to navigate away from the messaging application to view the linked content. A messaging application is provided that may be configured to enable users to dynamically collaborate regarding links or data within a sent message or a receive message. In aspects, a collaborative user experience (UX) is provided, which may be an interface within a message that enables real-time collaboration between a sender and one or more recipients regarding message content—without exchanging additional messages or navigating away from the messaging application.

20 Claims, 27 Drawing Sheets

(51) Int. Cl.
G06F 40/30 (2020.01)
G06F 3/0481 (2022.01)
G06F 3/0482 (2013.01)
G06N 5/04 (2023.01)
H04L 51/08 (2022.01)
G06F 3/04842 (2022.01)

(52) U.S. Cl.
CPC ............... *G06F 40/30* (2020.01); *G06N 5/04* (2013.01); *G06N 20/00* (2019.01); *H04L 51/08* (2013.01)

(56) References Cited

U.S. PATENT DOCUMENTS

| | | | |
|---|---|---|---|
| 8,719,325 | B2 | 5/2014 | Sawicki et al. |
| 8,938,669 | B1 | 1/2015 | Cohen |
| 9,224,131 | B2 | 12/2015 | Gruen et al. |
| 9,300,609 | B1 * | 3/2016 | Beausoleil .......... H04L 12/1827 |
| 9,342,333 | B2 | 5/2016 | Charles |
| 9,479,469 | B2 | 10/2016 | Kabbes et al. |
| 9,721,030 | B2 | 8/2017 | Parish et al. |
| 10,534,533 | B2 * | 1/2020 | Peterson ................ G06F 3/0486 |
| 2002/0099775 | A1 * | 7/2002 | Gupta .................. G06Q 10/107 709/205 |
| 2005/0033811 | A1 | 2/2005 | Bhogal et al. |
| 2008/0189622 | A1 | 8/2008 | Sanchez et al. |
| 2009/0216843 | A1 | 8/2009 | Willner et al. |
| 2013/0117376 | A1 | 5/2013 | Filman |
| 2015/0154156 | A1 * | 6/2015 | Meyers, Jr. ........... G06F 40/134 715/205 |
| 2017/0364866 | A1 | 12/2017 | Steplyk et al. |

OTHER PUBLICATIONS

"How to Share Drafts and Edit Them Together~Front", Retrieved from: https://web.archive.org/web/20200804225907/https:/help.frontapp.com/t/1824vd/how-to-share-drafts-and-edit-them-together, Mar. 2, 2020, 11 Pages.

"Share Files and Folders", Retrieved from: https://web.archive.org/web/20161027163832/https://www.zoho com/docs/help/secure-sharing.html, Oct. 27, 2016, 12 Pages.

"Share Your Draft with Another Account~Google Apps", Retrieved from: https://sites.google.com/site/scriptsexamples/available-web-apps/mail-merge/documentation/send-messages/share-your-draft-with-another-account. Retrieved Date: Oct. 7, 2020, 6 pages.

"View and edit an attachment in Outlook Web App", Retrieved from: https://support.microsoft.com/en-us/office/view-and-edit-an-attachment-in-outlook-web-app-e36b3369-5141-4367-b276-85547e1da18d, Retrieved Date: Oct. 9, 2020, 5 Pages.

"Work with Yammer from Outlook", Retrieved from: https://support.microsoft.com/en-us/office/work-with-yammer-from-outlook-fd695485-225b-410f-b24a-17f971b46b25, Retrieved Date: Oct. 9, 2020, 6 Pages.

Gartenberg, Chaim, "Twobird is a collaborative email app from the developer of Notability", Retrieved from: https://www.theverge.com/2020/5/12/21255231/twobird-collaborative-email-app-ginger-labs-notability-windows-mac-ios-android-notes, May 12, 2020, 4 Pages.

Grundy, Jeff, "How to Put a YouTube Video into an Email", Retrieved from: https://web.archive.org/web/20180630035757/http:/smallbusiness.chron.com/put-youtube-video-email-43689.html, Jun. 30, 2018, 4 Pages.

Lardinois, Frederic, "Microsoft's Fluid Framework is now open source, comes to Office 365", Retrieved from: https://techcrunch.com/2020/05/1 9/microsofts-fluid-framework-is-now-open-source-comes-to-office-365/, May 19, 2020, 3 Pages.

Lekkalpudi, Manogna, "Shared Drafts for Gmail", Retrieved from: https://hiverhq.com/blog/shared-drafts-for-gmail, Retrieved Date: Oct. 7, 2020, 8 Pages.

Warren, Tom, "Microsoft's New Fluid Office Document Is Google Docs on Steroids", Retrieved from: https://www.theverge.com/2020/5/19/21260005/microsoft-office-fluid-web-document-features-build, May 19, 2020, 9 Pages.

* cited by examiner

Mail – Kat Larsson 420A

⊕ New  ✉ Send  📎 Insert  🗑 Delete  |  Apps  Move To ∨  Categories ∨  …  👤 Kat

🔍 Search mail and people

< Folders — 422C
Inbox 15
Archive
Junk 1
Drafts 5
Sent
Deleted 29

< Categories
Family 3
Newsletters 17
Shopping 11
Social Updates 5
Travel

Focused  Tasks  All ∨

Groupon Getaways
Seaside Retreat | Maui, Haw…
Groupon Getaways See All G…

Joe Doe — 408C
Party Plan
Hi Kat and Diane –

Anna Gonzalez
Can someone share the latest…
What lies before us and what lies…

Diane Kruz; Ed Scharg
Great Job!
Joe and Kat - Thanks for your hard…

Joe Doe
FW: Check out these photos…

---

From: Joe Doe — 418
Monday, June 6, 2015 | 4:08 PM

Party Plan

Hi Kat and Diane –

I started a list of to-do items for the Christmas Party. @kat.larson — 436C
@diane.kruz -- can you think of anything else?

🔗 Interactive link — 440C
• Identify venue and confirm availability
• Reserve venue  ← 414
• Contract caterer
• Send save-the-date email  — 450
• Create check… |Joe
                      448B Thanks!
Joe

[ Reply ]   [ Discard ]

📎  ◐  ☑ | Aa 400C
408C
438C
406C
404C
402C

CONVERTING LINKS AND STATIC DATA INTO COLLABORATIVE USER EXPERIENCES

BACKGROUND

Messaging applications, including email applications, chat applications, social platforms, and the like, are widely utilized in business and personal communications. Such communications typically involve exchanges of multiple messages between users. For example, a discussion on a topic may be conducted in an email thread (or threads) in which users may exchange a number of email messages to provide information and ideas about the topic. If a user later wishes to review the discussion to summarize or identify consensus, the user will likely need to review multiple email messages to find the information, which may be cumbersome and inefficient. As a result, collaboration between users using messaging applications is often inefficient and ineffective.

In one typical collaboration scenario, a user may insert a link into a message (e.g., an email message, chat message, text message, social thread, or the like), where the link is directed to content that is stored elsewhere (e.g., document, video, image, streaming content, and the like). A recipient of such a message may view static content in the message (e.g., salutation, comments, instructions, data, etc.) within a messaging application, and then may click on the link to navigate away from the messaging application and open the linked content (e.g., the document, video, image, etc.) in another application, such as a browser directed to a website hosting an online streaming service, a word processing application launching a document, or the like. The recipient may then correspond with one or more other users on the linked content by replying to the original message or sending a new message in a new message thread.

In another typical collaboration scenario, a user may input text (e.g., salutation, comments, instructions, questions, etc.) and structured data (e.g., bulleted list, numbered list, numbered questions, table, and the like) into a message. A recipient of such a message may collaborate on the structured data by replying to the message and responding to one or more items within the structured data, e.g., by responding in-line (often in a different font) to the one or more items. Here again, the sender and other recipients must review multiple messages and/or message threads to summarize the various recipient's responses to each item. Neither of the above scenarios provides an adequate solution to collaborating regarding the linked content or structured data using a messaging application.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, messaging applications (such as email, social networking platforms, text (e.g., SMS), instant messaging (IM), chat, etc.) may be configured to enable users to dynamically collaborate regarding links or data within a sent message or a received message—without exchanging additional messages. Moreover, with respect to linked content, users can dynamically collaborate regarding the linked content within the context of the messaging application without navigating away to another application. In aspects, a collaborative user experience (UX) is provided, which may be an interface customized for content within a message and which, when rendered in the message, enables real-time collaboration between a sender and one or more recipients regarding the content—without exchanging additional messages or navigating away from the messaging application.

In a first scenario, a messaging application may receive a link within a message being composed by a user (e.g., sender). In an example, a link may be a pointer, pathway, or identifier of content residing outside of the messaging application. In aspects, the link may be evaluated to determine whether a collaborative user experience (UX) customized for the link is available. If so, the collaborative UX may be rendered in the compose message including linked content (e.g., content retrieved via the link). Upon sending the message, the sender may interact with the content and/or one or more recipients within the collaborative UX in the sent message, and the one or more recipients may interact with the content and/or the sender and other recipients within the collaborative UX in a received message. In aspects, an interaction within a collaborative UX in one message (e.g., a sent message or a received message) may be synchronized across the related collaborative UXs in others of the messages (e.g., received message(s) or sent message) in near real-time. In this way, users may collaborate regarding linked content in a message without exchanging additional messages or navigating away from the messaging application.

In a second scenario, a messaging application may receive structured data and text within a message being composed by a user (e.g., sender). In an example, structured data may comprise any type of formatted data, such as a bulleted list, a numbered list, a table, a chart, and the like. In aspects, the text may be evaluated to determine whether the sender has an intent to collaborate regarding the structured data. For instance, machine learning may be applied to the text to identify indications of an intent to collaborate, such as @mentions of other users or terms associated with collaboration (e.g., "decide," "choose," "vote," "confer," "brainstorm," "collaborate"). In some cases, the structured data may itself be an indication of an intent to collaborate (e.g., a numbered list of questions, voting buttons, etc.). If it is determined that the sender intends to collaborate, the structured data may be evaluated to determine whether a collaborative user experience (UX) customized for the structured data is available. If so, the collaborative UX may be rendered in the compose message including the structured data. Upon sending the message, the sender may interact with the structured data and/or one or more recipients within the collaborative UX in the sent message, and the one or more recipients may interact with the content and/or the sender and other recipients within the collaborative UX in a received message. In aspects, an interaction within a collaborative UX in one message (e.g., a sent message or a received message) may be synchronized across the related collaborative UXs in others of the messages (e.g., received message(s) or sent message) in near real-time. In this way, users may collaborate regarding structured data in a message without exchanging additional messages.

In aspects, a system having at least one processing unit and at least one memory storing computer-executable instructions is provided. The computer-executable instructions, when executed by the at least one processor, cause the at least one processor to perform actions. The actions include receiving a link into a message being composed by a user and determining a content type associated with the link. Based on the content type, the actions further include identifying a collaborative user experience (UX) customized for the content type and retrieving metadata associated with the identified collaborative UX. Based on the metadata, the actions include causing a first collaborative UX to be rendered in the message, where the first collaborative UX includes content retrieved based on the link. The actions also include receiving an indication to send the message to at least one recipient and, within a sent message corresponding to the message, causing the first collaborative UX to be automatically updated based on a change received to a second collaborative UX in a received message corresponding to the message.

In further aspects, a method for converting structured data into a collaborative user experience (UX) is provided. The method includes receiving structured data and text into a message being composed by a user and determining a data type associated with the structured data. Based on evaluating at least the text, the method includes determining an intent to collaborate by the user and, in response to determining the intent to collaborate, identifying a collaborative user experience (UX) customized for the data type. Additionally, the method includes causing a first collaborative UX corresponding to the identified collaborative UX to be rendered in the message and populating the first collaborative UX with the structured data. The method also includes receiving an indication to send the message to at least one recipient and, within a sent message corresponding to the message, causing the first collaborative UX to be automatically updated based on a change received in a second collaborative UX in a received message corresponding to the message.

In still further aspects, a computer storage medium storing computer-executable instructions that when executed cause at least one processor to perform actions is provided. The actions include receiving a link into a message being composed by a user and determining a content type associated with the link. Based on the content type, the actions include identifying a collaborative user experience (UX) customized for the content type and, based on the identified collaborative UX, causing a first collaborative UX to be rendered in the message, where the first collaborative UX includes content retrieved based on the link. Additionally, the actions include receiving an indication to send the message to at least one recipient and, within a sent message corresponding to the message, cause the first collaborative UX to be automatically updated based on a change received to a second collaborative UX in a received message corresponding to the message.

Any of the one or more above aspects in combination with any other of the one or more aspects. Any of the one or more aspects as described herein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 4A-4E depict a user interface 400 of a messaging application for converting structured data into a collaborative user experience (UX), in accordance with examples of the present disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Traditional messaging applications (such as email, social networking platforms, text, instant messaging, chat, etc.) are ill-equipped for collaboration. For instance, a sender and recipients corresponding regarding a topic are often required to exchange multiple messages. As a result, determining a consensus regarding the topic or summarizing the collaboration is difficult and cumbersome. Moreover, when links are included in messages, recipients are required to navigate away from the messaging application to view the linked content. A messaging application is provided that may be configured to enable users to dynamically collaborate regarding links or data within a sent message or a receive message. In aspects, a collaborative user experience (UX) is provided, which may be an interface within a message that enables real-time collaboration between a sender and one or more recipients regarding message content—without exchanging additional messages or navigating away from the messaging application.

It should be appreciated that although, for exemplary purposes, described embodiments generally relate to messaging applications and, more particularly, email applications, the present methods and systems are not so limited. For example, interactive components described herein may be used to provide collaborative experiences in applications other than messaging and/or email applications, such as word processing applications, spreadsheet applications, notebook applications, presentation applications, instant messaging or chat applications, social networking platforms, and the like.

Figure 1:
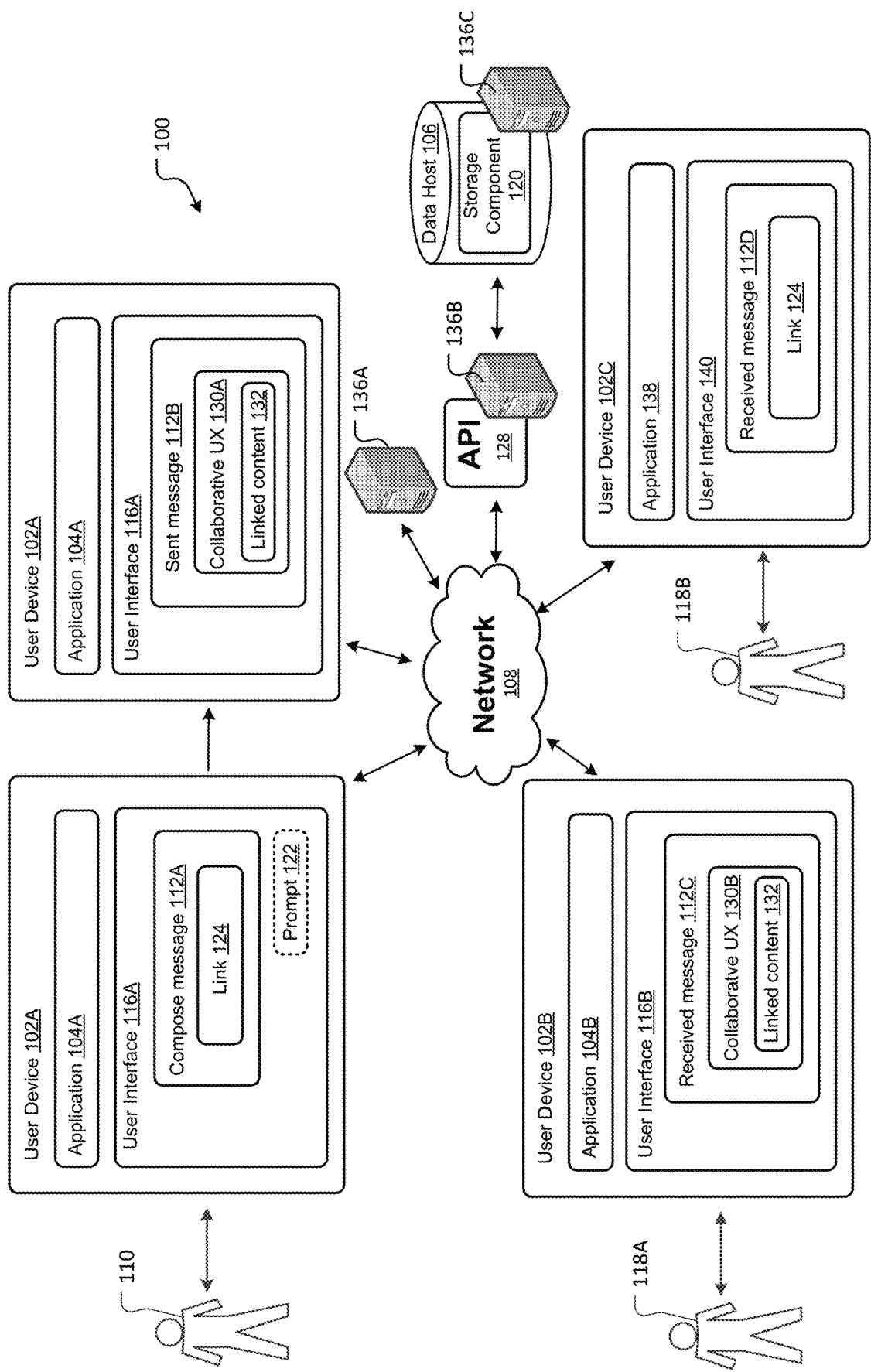
FIG. 1 is a block diagram of a system in which a link may be input into a user interface of an application and the link may be converted into a collaborative user experience, in accordance with an embodiment of the present disclosure.

FIG. 1 is a block diagram of a system in which a link may be input into a user interface of an application and the link may be converted into a collaborative user experience, in accordance with an embodiment of the present disclosure.

In particular, FIG. 1 illustrates an overview of an example system 100 through which a link 124 to content may be converted into a collaborative user experience (UX) 130, which includes linked content 132 within a message 112 associated with an application 104 (e.g., a messaging application). Linked content 132 may comprise any content (e.g., a video, an image, a document, streaming content, and the like) to which the link 124 (e.g., URL, storage pathway, pointer, etc.) is directed. For instance, the linked content 132 may be located on a webpage of a website, in shared storage, or at any other location identified by link 124. That is, the linked content 132 may be a streaming video residing on a website and the link 124 may be directed to the streaming video on the website. A collaborative UX 130 may be defined as an interface configured to enable real-time interaction between two or more users and/or the two or more users and linked content 132. Such interactions with other users and/or linked content 132 may involve concurrent editing of linked content 132, instant messaging regarding the linked content 132, in-line responses to the linked content 132 that are received and synchronized within the collaborative UX 130, or any other form of collaboration.

In still further aspects, a collaborative UX may be customized based on the content type of linked content 132. That is, a first collaborative UX 130 customized for one content type (e.g., a document) may include collaborative features and functionalities specific to documents, such as editing functionality, location tracking for different users editing the document, collaboration thread functionality, etc.; whereas a second collaborative UX 130 for another content type (e.g., a video) may include other collaborative features and functionalities specific to videos, such as video start/end time settings, chapter navigation controls, video play controls, queued transcription functionality, collaboration thread functionality, etc. Thus, these customized features and functionalities associated with a particular collaborative UX 130 enable users to not only collaborate with one another in different ways, but also to interact with the different types of content in different ways. Additionally, a collaborative UX 130 may be customized for specific linked content 132 of the same content type (e.g., a YouTube™ video versus a Microsoft Stream™ video versus a Vimeo™ video). In this way, users may effectively collaborate regarding particular linked content 132 within a customized collaborative UX 130 without requiring back-and-forth message exchanges.

The system 100 may include a plurality of user devices 102A-C configured to run or otherwise execute applications 104A-B or application 138. The user devices 102A-C may include, but are not limited to laptops, tablets, desktop computers, wearable devices, smartphones, and the like. The applications 104A-B and application 138 ("hosting applications") may include applications having messaging functionality, such as email applications, chat applications, meeting applications, instant messengers, and the like, and/or may include other types of applications, such as word processing applications, spreadsheet applications, notebook applications, and the like. Non-limiting examples of applications 104 include Microsoft Outlook™, Gmail™, Microsoft Teams™, Google Hangouts™, Facebook Messenger™ Microsoft Office™ suite, Microsoft 365™, Google Drive™, and the like. In some examples, the applications 104A-B and application 138 may include web applications, such as but not limited to Outlook Web Access™ or Gmail™ web applications, where such applications 104A-B and application 138 may run or otherwise execute instructions on servers in the cloud via web browsers. In some examples, the applications 104A-B and application 138 may additionally or alternatively include native client applications residing on the user devices 102A-C.

The plurality of user devices 102A-C may be communicatively coupled to one or more servers 136A-C, an application programing interface (API) 128, and/or a data host 106 associated with one or more storage components 120 via a communication network 108. In aspects servers 136A-C may comprise a single server 136 (e.g., associated with multiple virtual servers) or multiple servers 136, such as a server farm or multiple server farms. The servers 136A-C may perform the same or different processes. For example, one server 136A may evaluate the link 124 to determine whether the link 124 can be converted to a collaborative UX, another server 136B may host API 128, and yet another server 136C may interact with data host 106 to manage the one or more data storage components 120. In another example, a single server 136 may perform multiple of the processes above. A storage component 120 may be, for example, a file in a user drive that may be associated with the user 110 on data host 106. Alternatively, a storage component 120 may comprise any suitable data structure or partitioned memory other than a file for storing data associated with a collaborative UX.

Communication network 108 may enable communication between the applications 104A-B, servers 136A-C, API 128, and data host 106, as well as communication between different ones of the applications 104A-B and application 138. The communication network 108 may be a wide area network (WAN) such as the Internet, a local area network (LAN), or any other suitable type of communication network. Additionally or alternatively, communication network 108 may operate over distributed systems (e.g., cloud-based computing systems), where application functionality, memory, data storage and retrieval, and various processing functions may be operated remotely from each other over a distributed system, such as the Internet or an intranet. In some embodiments, communication network 108 may be a single communication network or may be made up of multiple different communication networks. Non-limiting examples of data host 106 include Microsoft SharePoint™, Microsoft OneDrive™, Google Drive™ and DropBox™. In some embodiments, the data host 106 may be shared and accessible by at least applications 104A-B in a suitable manner other than via the communication network 108. In some examples, the data host 106 may be included in or directly coupled to user devices 102A-B, and may be locally accessibly by applications 104A-B executing on the user devices 102A-B, or applications 104A-B executing on user devices 102A-B may access the data host 106 by way of the communication network 108. In some cases, upon appropriate permissions, application 138 executing on user device 102C may access data host 106 via communication network 108.

The applications 104A-B and application 138 may allow users of the user devices 102A-C to communicate (e.g. send messages such as email messages, text messages (e.g., SMS), and/or instant messages), or otherwise interact, over the communication network 108. In one embodiment, at least some of the applications 104 (e.g., application 104A) may be configured to receive a link 124 into a compose message 112A (e.g., a message prior to sending). In aspects, the link 124 may be evaluated to determine whether a collaborative UX 130 is available for the link 124. If a collaborative UX 130 is available, a prompt 122 may be provided in the user interface (UI) 116A of application 104A. Prompt 122 may indicate that link 124 can be converted to a collaborative UX 130 and may provide a selectable control such that the sender (e.g., user 110) may accept or initiate conversion of link 124 into the collaborative UX 130A. In this case, metadata may be generated for rendering the collaborative UX 130A, such as a code pointer to custom code for generating the collaborative UX 130A, configuration information for retrieving the linked content 132 (e.g., the video ID and/or a name field), and a load pointer to a code loader for ingesting the metadata and loading the collaborative UX 130A, for example. In response to receiving an acceptance from the user 210 for converting the link 124, the metadata may be ingested by the code loader and the collaborative UX 130A with linked content 132 may be rendered in the compose message 112A.

If user 110 does not desire link 124 to be converted, the user may decline or ignore the prompt 122 and can proceed with composing a traditional message including link 124. In another embodiment, at least application 138 is not configured to convert a link into a collaborative user experience (UX). That is, application 138 may be a legacy version of the same application (e.g., a legacy version of Microsoft Outlook™) or may be a different application of the same application type (e.g., a Gmail email application versus an Outlook email application). In this case, user 118B would not receive a prompt and would compose a traditional message including link 124 in UI 140.

As noted above, if the sender initiates conversion of link 124, application 104A may be configured to automatically convert link 124 into a collaborative UX 130A within the compose message 112A (e.g., prior to sending), as well as a collaborative UX 130A within a sent message 112B, and application 104B may be configured to render a collaborative UX 130B within received message 112C. The collaborative UXs 130A-B may be rendered and displayed, for example, "in-line" with static content (e.g., message text that is not part of link 124) associated with compose message 112A, sent message 112B and received message 112C. Here, "in-line" refers to placement of a collaborative UX with respect to other static content of a message (e.g., above, below or between). Additionally or alternatively, a collaborative UX may be considered "in-line" within the context of application 104 such that a user need not navigate away from application 104 to view linked content 132 associated with link 124. In this way, collaborative UXs 130A-B within the compose, sent and received messages 112A-C, respectively, may allow user 110 (e.g., "sender") and user 118A ("first recipient") to collaboratively interact regarding the linked content 132 from directly within the messages 112A-C—without exchanging further messages and without navigating away from the applications 104A-B (e.g., host applications such as messaging applications). With reference to application 138, which is not configured to provide a collaborative UX 130, for example, because application 138 is unable to interpret the metadata, (or unable to access code or stored data identified by the metadata) for the link 124. In this case, The UI 140 associated with application 138 may display received message 112D including link 124 in a traditional way. Thus, user 118B ("second recipient") must navigate away from application 138 to follow link 124 and view linked content 132.

As described in more detail below, according to an embodiment, a link 124 that is input into a compose message 112A (prior to sending) may comprise any path to content that is stored elsewhere, such as any type of Uniform Resource Identifier (URI). Some URIs, such as a Uniform Resource Locator (URL), may identify an address of linked content 132 on a webpage of a website or a pathway (or pointer) to linked content 132 in a storage component 120 on a data host 106 within a local, wide, or cloud-based network environment. When the link 124 in compose message 112A is converted to collaborative UX 130A, the link 124 may be combined with metadata. The metadata may include a code pointer to custom code for generating the collaborative UX 130A, a pointer to (or identifier of) a code loader, configuration information for retrieving the linked content (e.g., video ID, name field), or the like. When the custom code is executed by the code loader, the collaborative UX 130A may be rendered within the compose message 112A and, when the link 124 is followed (and/or the configuration information is read), the linked content 132 may be displayed within the collaborative UX 130A. A data pointer to a location in storage component 120 may also be created to store data associated with collaborative UX 130A (e.g., for synchronizing any updates to the collaborative UX 130, such as edits to or comments regarding the linked content 132). Thus, at least application 104A may be configured to convert link 124 into a collaborative UX 130A that includes linked content 132 within a compose message 112A by generating and providing metadata with link 124.

In examples in which user 110 initiates conversion of the link 124, upon sending compose message 112A, application 104A may store sent message 112B. For instance, sent message 112B may be accessible to user 110 in a sent folder of an email application, or within a message thread of an instant messaging or text messaging application, for example. In this case, based on the metadata, application 104A may render the collaborative UX 130A including linked content 132 in sent message 112B. The sender (e.g., user 110) may then collaborate with the first recipient (e.g., user 118A) regarding linked content 132 via collaborative UX 130A within sent message 112B—and without exchanging additional messages. Similarly, upon receiving message 112C, application 104B may retrieve the metadata associated with link 124 to render the collaborative UX 130B including linked content 132 in received message 112C. The first recipient, without exchanging additional messages, may collaborate with the sender regarding linked content 132 via collaborative UX 130B within received message 112C. On the other hand, the second recipient (e.g., user 118B) must navigate away from application 138 to view linked content 132 (e.g., via a browser), and must exchange at least one additional message (e.g., reply or reply all) to received message 112D in order to collaborate with the sender (e.g., user 110) and/or the first recipient (e.g., user 118A).

In some embodiments, the applications 104A-B may be configured to receive one or more changes to linked content 132 of collaborative UX 130A-B from a user (e.g., user 110 and/or user 118A). The received change may then be communicated to server 136C and/or directly to data host 106 and the data associated with the collaborative UX 130 in storage component 120 (e.g., a file in memory) may be updated with the received change. Further, the updated data may be synchronized across the collaborative UXs 130A-B in sent message 112B and received message 112C. In this way, both the sender and the first recipient are able to collaborate in near real-time regarding linked content 132 via collaborative UX 130A within the sent message 112B and collaborative UX 130B within the received message 112C. In an example, "near" real-time may account for any minimal time associated with receiving the change, transmitting the change to data host 106, updating the data in storage component 120, and synchronizing the updated data on the collaborative UXs 130A-B via the communication network 108, for example.

As should be appreciated, since collaborative UXs 130A-B are updated within the sent and received messages 112A-B, the sender and the first recipient are not required to exchange additional messages and/or navigate away from applications 104A-B. Accordingly, the most current collaborative data associated with linked content 132 may be displayed to a sender in UI 116A whenever sent message 112A is selected (e.g., from a sent folder) or displayed to a recipient (e.g., first recipient) in UI 116B whenever received message 112B is selected (e.g., from the inbox). In this way, if sent message 112A is displayed to the sender concurrently with displaying received message 112B to the first recipient, any changes made by either the sender via collaborative UX 130A or the first recipient via collaborative UX 130B may be visible, in near real-time, to the other user. As should be appreciated, since application 138 is not configured to provide a collaborative UX 130, second recipient 118B will be unable to view updates regarding the collaboration on linked content 132 in near real-time and will need to rely on additional message exchanges or other communications (e.g., verbal communications) to remain abreast of any updates to the collaboration with the sender and/or the first recipient.

It should be appreciated that although application 104A is generally described herein as being used by a sender to compose and send a message, and application 104B is generally described herein as being used by a first recipient to view the message, the applications 104A-B can generally be used to compose, send, and receive messages with collaborative UXs including linked content. The application 104A may generally be the same as or similar to application 104B (e.g., application 104A being Outlook Web Access and application 104B being a local version of Outlook running on device 102B).

As should be appreciated, the various systems, devices, applications, features, etc., described with respect to FIG. 1 are not intended to limit the system 100 to being performed by the particular applications and features described. Accordingly, additional configurations may be used to practice the methods and systems herein and/or features and applications described may be excluded without departing from the methods and systems disclosed herein.

Figure 2:
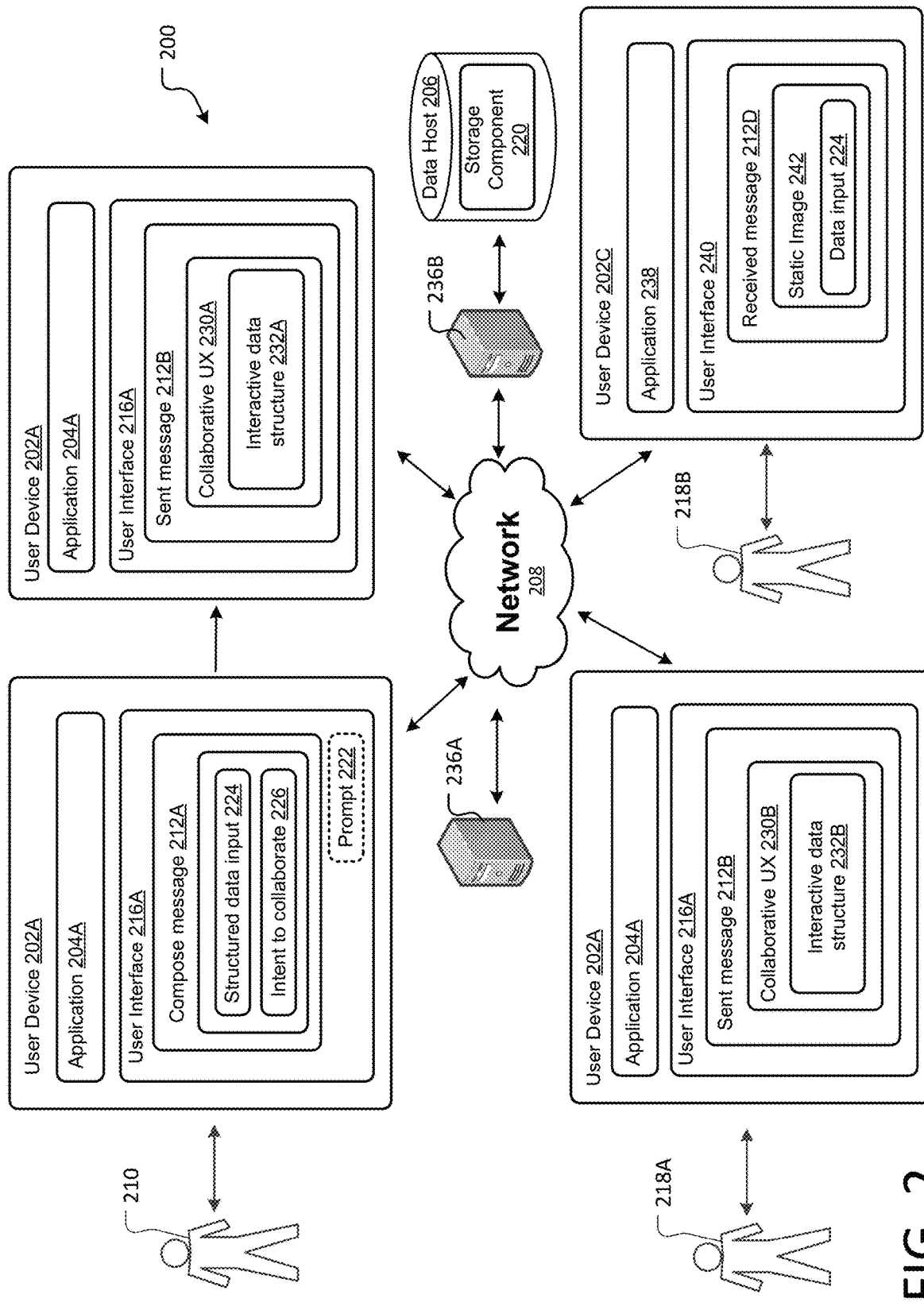
FIG. 2 is a block diagram of a system in which structured data may be input into a user interface of an application and the structured data may be converted into a collaborative user experience, in accordance with an embodiment of the present disclosure.

FIG. 2 is a block diagram of a system in which structured data may be input into a user interface of an application and the structured data may be converted into a collaborative user experience, in accordance with an embodiment of the present disclosure.

FIG. 2 illustrates an overview of an example system 200 through which structured data input 224 may be converted into a collaborative user experience (UX) 230 when it is determined that a user has an intent to collaborate 226 regarding the structured data input 224. The structured data input 224 may comprise any type of formatted data, such as a bulleted list, a numbered list, a table, a chart, and the like. As explained further below, a user's (e.g., sender's) intention to collaborate may be determined by evaluating the structured data input and the text input within a compose message 212A and applying machine learning to detect the intent to collaborate 226.

Upon detecting the intent to collaborate 226, application 204 may evaluate the structured data input 224 to identify a structured data type (e.g., bulleted list, numbered list, table, and the like) associated with the structured data input 224. Based on the structured data type, application 204 may determine whether a corresponding collaborative UX 230 including an interactive data structure 232 is available for the structured data type. If so, the interactive data structure 232 may be populated with the structured data input 224. In aspects, an interactive data structure 232 is a dynamic container whereby the initial structured data input 224 may be updated within one message (e.g., a sent message) and may be reflected in near real-time in a corresponding interactive data structure 232 in another message (e.g., a received message). Updated data may comprise data that is added, deleted, or edited in an interactive data structure within a message.

A collaborative UX 230 may be defined as an interface configured to enable real-time interaction between two or more users and/or the two or more users and the interactive data structure 232. Such interactions with other users and/or interactive data structure 232 may involve concurrent editing of data within the interactive data structure 232, instant messaging regarding the data within the interactive data structure 232, in-line responses to the structured data that are received and synchronized within the interactive data structure 232, or any other form of collaboration.

In aspects, a collaborative UX 230 may be customized based on the structured data type corresponding to the interactive data structure 232. That is, a first collaborative UX 230 comprising first interactive data structure 232 (e.g., for a bulleted list) may include first collaborative features and functionalities such as editing controls for editing data; whereas a second collaborative UX 230 comprising another interactive data structure 232 (e.g., for a numbered list of questions) may include second collaborative features and functionalities such as text boxes or other input controls or fields for adding responses in-line with each question. Thus, these customized features and functionalities for different collaborative UXs not only enable users to collaborate with one another in different ways, but also enable users to interact with different interactive data structures in different ways. In this way, users may effectively collaborate regarding particular interactive data structures within a customized collaborative UX 230 without requiring back-and-forth message exchanges.

With further respect to system 200, a plurality of user devices 202A-C configured to run or otherwise execute applications 204A-B or application 238 may be described. The user devices 202A-C may include, but are not limited to laptops, tablets, desktop computers, wearable devices, smartphones, and the like. The applications 204A-B and application 238 ("hosting applications") may include applications having messaging functionality, such as email applications, chat applications, meeting applications, instant messengers, and the like, and/or may include other types of applications, such as word processing applications, spreadsheet applications, notebook applications, and the like. Non-limiting examples of applications 204 include Microsoft Outlook™, Gmail™, Microsoft Teams™, Google Hangouts™, Facebook Messenger™, Microsoft Office™ suite, Microsoft Office 365™, Google Drive™, and the like. In some examples, the applications 204A-B and application 238 may include web applications, such as but not limited to Outlook Web Access™ or Gmail™ web applications, where such applications 204A-B and application 238 may run or otherwise execute instructions on servers in a cloud computing environment. In some examples, the applications 204A-B and application 238 may additionally or alternatively include native client applications residing on the user devices 202A-C.

The plurality of user devices 202A-C may be communicatively coupled to one or more servers 236A-B and/or a data host 206 associated with one or more storage components 220 via a communication network 208. In aspects servers 236A-B may comprise a single server 236 (e.g., associated with multiple virtual servers) or multiple servers 236, such as a server farm or multiple server farms. The servers 236A-B may perform the same or different processes. For example, one server 236A may evaluate the structured data input and the text input to determine whether the user 210 intends to collaborate and whether the structured data input can be converted to a collaborative UX, another server 236B may interact with data host 206 to manage the one or more data storage components 220. In another example, a single server 236 may perform multiple of the processes above. A storage component 220 may be, for example, a file in a user drive that may be associated with the user 210 on data host 206. Alternatively, a storage component 220 may comprise any suitable data structure or partitioned memory other than a file for storing data associated with a collaborative UX 230 and/or an interactive data structure 232.

Communication network 208 may enable communication between the applications 204A-B, servers 236A-B, and data host 206, as well as communication between different ones of the applications 204A-B and application 238. The communication network 208 may be a wide area network (WAN) such as the Internet, a local area network (LAN), or any other suitable type of communication network. Additionally or alternatively, communication network 208 may operate over distributed systems (e.g., cloud-based computing systems), where application functionality, memory, data storage and retrieval, and various processing functions may be operated remotely from each other over a distributed system, such as the Internet or an intranet. In some embodiments, communication network 208 may be a single communication network or may be made up of multiple different communication networks. Non-limiting examples of data host 206 include Microsoft SharePoint™, Microsoft OneDrive™, Google Drive™ and DropBox™. In some embodiments, the data host 206 may be shared and accessible by at least applications 204A-B in a suitable manner other than via the communication network 208. In some examples, the data host 206 may be included in or directly coupled to user devices 202A-B, and may be locally accessibly by applications 204A-B executing on the user devices 202A-B, or applications 204A-B executing on user devices 202A-B may access the data host 206 by way of the communication network 208. In some cases, upon appropriate permissions, application 238 executing on user device 202C may access data host 206 via communication network 208.

The applications 204A-B and application 238 may allow users of the user devices 202A-C to communicate (e.g. send messages such as email messages, text messages (e.g., SMS), and/or instant messages), or otherwise interact, over the communication network 208. In one embodiment, at least some of the applications 204 (e.g., application 204A) may be configured to receive structured data input 224 and text input into a compose message 212A (e.g., a message prior to sending). In response to the input in compose message 212A, application 204A may evaluate the structured data input 224 and the text input and apply machine learning to detect an intent to collaborate 226. For instance, the machine learning algorithm(s) may be trained to identify indications of an intent to collaborate 226 within the text input, such as @mentions of other users (e.g., user 218A or user 218B), terms associated with collaboration (e.g., "decide," "choose," "vote," "confer," "brainstorm," "collaborate," and the like), and the like. In some cases, the structured data input 224 may itself be an indication of an intent to collaborate 226 (e.g., a numbered list of text strings each followed by a question mark or voting buttons).

Application 204 may further evaluate the structured data input 224 to identify a structured data type (e.g., bulleted list, numbered list, table, etc.) associated with the structured data input 224. Based on the structured data type, application 204 may determine whether a corresponding collaborative UX 230 including an interactive data structure 232 is available for the structured data type. In an example, a corresponding collaborative UX may refer to a collaborative UX that has been customized for a structured data type. A collaborative UX customized for a particular structured data type may comprise an interactive data structure corresponding to the structured data type. That is, for a bulleted list data type, the interactive data structure may comprise a dynamic container for storing and updating data associated with a bulleted list; whereas for a table data type, the interactive data structure may comprise a dynamic container for storing and updating data associated with a table. In aspects, a collaborative UX customized for a particular structured data type may be associated with preconfigured metadata, including a pointer to custom code for building the collaborative UX and the associated interactive data structure, and a pointer to a code loader for ingesting the custom code and rendering the collaborative UX and the interactive data structure.

If a collaborative UX 230 is available, a prompt 222 may be provided in the user interface (UI) 216A of application 204A. Prompt 222 may indicate that the structured data input 224 can be converted to a collaborative UX 230 and may provide a selectable control such that the sender (e.g., user 210) may accept or initiate conversion of the structured data input 224 into the collaborative UX 230A. If so, the interactive data structure 232A may be populated with the structured data input 224 and stored in one or more storage components 220 on data host 206. Additionally, a data pointer or other link directed to the storage location of at least the data associated with the interactive data structure 232A (e.g., initially, the structured data input 224) may be generated. The data pointer may be added to the preconfigured metadata for rendering the collaborative UX 230A and the interactive data structure 232A including the initial data associated with the structured data input 224. In this case, metadata may include a code pointer to custom code for generating the collaborative UX 230A, a load pointer to a code loader for ingesting the custom code and loading the experience, and the data pointer directed to the storage location of at least the structured data input 224, for example.

In response to receiving an acceptance from the user 210 for converting the structured data input 224, the metadata may be ingested by the code loader and the collaborative UX 230A and interactive data structure 232 may be rendered in the compose message 212A. On the other hand, if user 210 does not desire the structured data input 224 to be converted, the user 210 may decline or ignore the prompt 222 and proceed with composing a traditional message including the structured data input 224. In another embodiment, at least application 238 is not configured to convert the structured data input 224 into a collaborative user experience. That is, application 238 may be a legacy version of the same application (e.g., a legacy version of Microsoft Outlook™) or may be a different application of the same application type (e.g., a Gmail email application versus an Outlook email application). In this case, user 218B would not receive a prompt and would compose a traditional message including the structured data input 224 in UI 240.

If the sender initiates conversion of the structured data input 224, application 204A may be configured to automatically convert structured data input 224 into a collaborative UX 230A within the compose message 212A (e.g., prior to sending), as well as a collaborative UX 230A within a sent message 212B, and application 204B may be configured to render a collaborative UX 230B within received message 212C. The collaborative UXs 230A-B may be rendered and displayed, for example, "in-line" with static content (e.g., message text that is not part of structured data input 224) associated with compose message 212A, sent message 212B and received message 212C. Here, "in-line" refers to placement of a collaborative UX with respect to other static content of a message (e.g., above, below or between). Additionally or alternatively, a collaborative UX may be considered "in-line" within the context of application 204 such that a user need not navigate away from application 204 to collaborate regarding structured data input 224. In this way, collaborative UXs 230A-B within the compose, sent and received messages 212A-C, respectively, may allow user 210 (e.g., "sender") and user 218A ("first recipient") to collaboratively interact regarding the structured data input 224 from directly within the messages 212A-C—without exchanging further messages and without navigating away from the applications 204A-B (e.g., host applications such as messaging applications). With reference to application 238, which is not configured to provide a collaborative UX 230, for example, because application 238 is unable to interpret the metadata (or unable to access custom code or stored data identified by the metadata) for converting the structured data input 224. In this case, the UI 240 associated with application 238 may display received message 212D including the structured data input 224 in a traditional way. Thus, in order to collaborate regarding the structured data input 224, user 218B ("second recipient") is required to exchange at least one additional message (e.g., reply or reply all).

In examples in which user 210 initiates conversion of the structured data input 224, upon sending compose message 212A, application 204A may store sent message 212B. For instance, sent message 212B may be accessible to user 210 in a sent folder of an email application, or within a message thread of an instant messaging or text messaging application, for example. In this case, based on the metadata, application 204A may render the collaborative UX 230A and the interactive data structure 232 (including the structured data input 224) in sent message 212B. The sender (e.g., user 210) may then collaborate with the first recipient (e.g., user 218A) regarding the structured data input 224 via collaborative UX 230A within sent message 212B—and without exchanging additional messages. Similarly, upon receiving message 212C, application 204B may retrieve the metadata associated with structured data input 224 to render the collaborative UX 230B and the interactive data structure 232 (including the structured data input 224) in received message 212C. The first recipient, without exchanging additional messages, may collaborate with the sender regarding the structured data input 224 via collaborative UX 230B within received message 212C. On the other hand, the second recipient (e.g., user 218B) must exchange at least one additional message (e.g., reply or reply all) to received message 212D in order to collaborate with the sender (e.g., user 210) and/or the first recipient (e.g., user 218A).

In some embodiments, the applications 204A-B may be configured to receive one or more changes to structured data input 224 of interactive data structure 232A-B within collaborative UX 230A-B from a user (e.g., user 210 and/or user 218A). The received change may then be communicated to server 236B and/or directly to data host 206 and the data associated with the collaborative UX 230 in storage component 220 (e.g., a folder in memory) may be updated with the received change. Further, the updated data may be synchronized across the collaborative UXs 230A-B in sent message 212B and received message 212C. In this way, both the sender and the first recipient are able to collaborate in near real-time regarding structured data input 224 via collaborative UX 230A within the sent message 212B, and collaborative UX 230B, within the received message 212C. In an example, "near" real-time may account for any minimal time associated with receiving the change, transmitting the change to data host 206, updating the data in storage component 220, and synchronizing the updated data on the collaborative UXs 230A-B via the communication network 208, for example.

As should be appreciated, since collaborative UXs 230A-B are updated within the sent and received messages 212A-B, the sender and the first recipient are not required to exchange additional messages to collaborate regarding the structured data input 224. Accordingly, the most current collaborative data associated with the structured data input 224 may be displayed to a sender in UI 216A whenever sent message 212A is selected (e.g., from a sent folder) or displayed to a recipient (e.g., first recipient) in UI 216B whenever received message 212B is selected (e.g., from the inbox). In this way, if sent message 212A is displayed to the sender concurrently with displaying received message 212B to the first recipient, any changes made by either the sender via collaborative UX 230A or the first recipient via collaborative UX 230B may be visible, in near real-time, to the other user.

Additionally or alternatively, the collaborative UXs 230A-B may be seamlessly shared with a different application, such as a different type of messaging application (e.g., instant messaging application, text messaging application, etc.), a social platform, a productivity application (e.g., word processing application, presentation application, spreadsheet application, etc.), and the like. As long as the different application is configured to render a collaborative UX, the different applications may retrieve the metadata associated with the shared collaborative UX 230A (or collaborative UX 230B) and follow the code and load pointers to ingest the custom code and render the collaborative UX within the different application. In this case, any updates made to the collaborative UX residing in the different application are synchronized with the data in the storage location, as well as with collaborative UXs 230A-B. Thus, a user interacting with the interactive data structure 232 within the collaborative UX shared with the different application is able to collaborate in near real-time regarding the structured data input 224 with both the sender and the recipient.

Since application 238 is not configured to provide a collaborative UX 230, second recipient 218B will be unable to view updates regarding the collaboration on the structured data input 224 in near real-time and will need to rely on additional message exchanges or other communications (e.g., verbal communications) to remain abreast of any updates in the collaboration with the sender and/or the first recipient.

It should be understood that although application 204A is generally described herein as being used by a sender to compose and send a message, and application 204B is generally described herein as being used by a first recipient to view the message, the applications 204A-B can generally be used to compose, send, and receive messages with collaborative UXs including integrative data structures. The application 204A may generally be the same as or similar to application 204B (e.g., application 204A being Outlook Web Access and application 204B being a local version of Outlook running on device 202B).

As should be appreciated, the various systems, devices, applications, features, etc., described with respect to FIG. 2 are not intended to limit the system 200 to being performed by the particular applications and features described. Accordingly, additional configurations may be used to practice the methods and systems herein and/or features and applications described may be excluded without departing from the methods and systems disclosed herein.

FIGS. 3A-3E depict a user interface 300 of a messaging application for converting a link into a collaborative user experience (UX), in accordance with examples of the present disclosure. In aspects, the messaging application depicted in FIGS. 3A-3E may be the same as or similar to the applications 104A-C depicted in FIG. 1 and applications 204A-C depicted in FIG. 2.

Figure 3A:
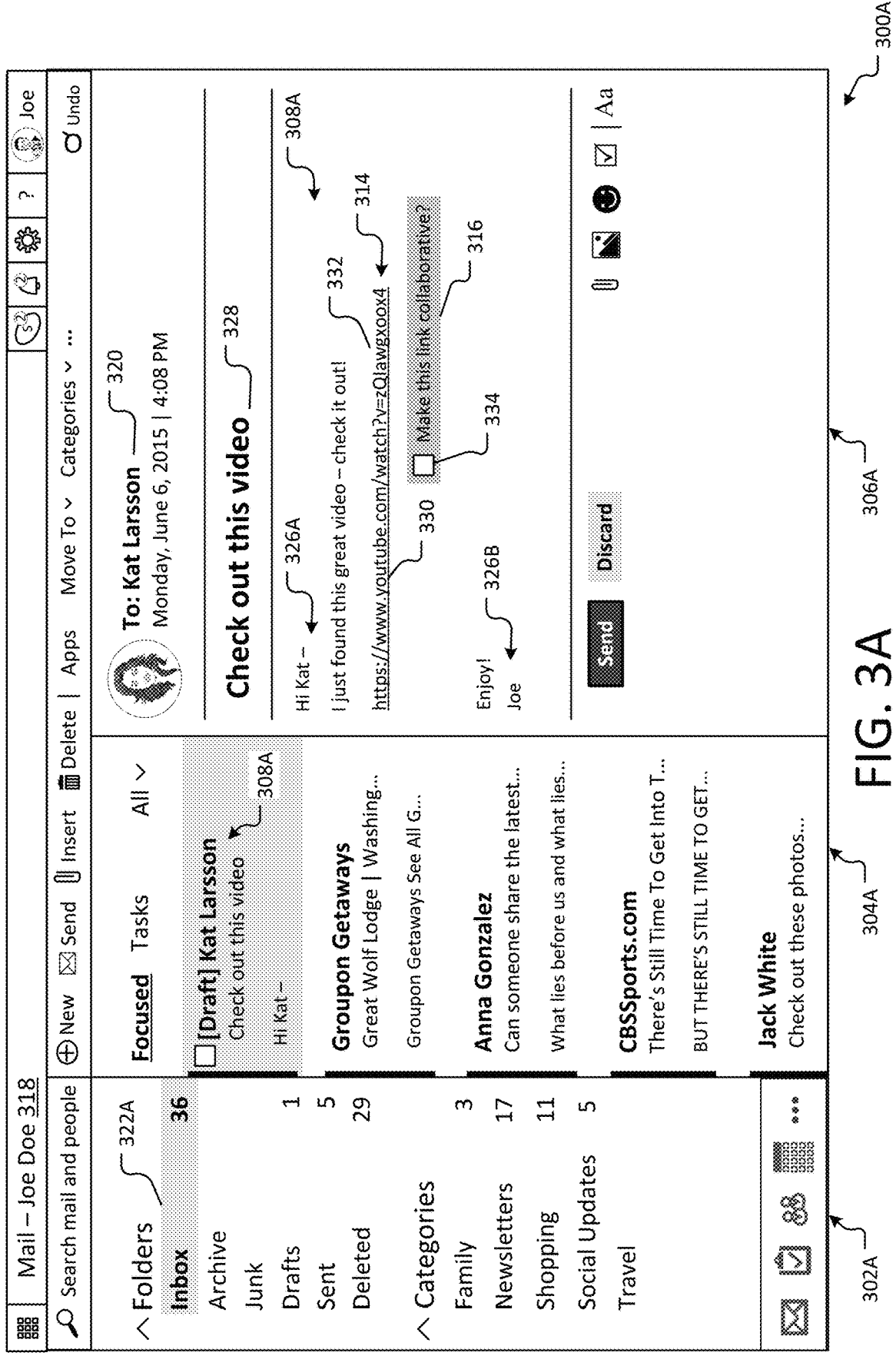
FIGS. 3A-3E depict a user interface of a messaging application for converting a link into a collaborative user experience (UX) within a message, in accordance with examples of the present disclosure.

FIG. 3A depicts a user interface 300A of a messaging application (e.g., an email messaging application) for receiving a link in a compose message, the user interface 300A including a navigation pane 320A, a list pane 304A, and a reading pane 306A, in accordance with examples of the present disclosure.

The user interface 300A of the messaging application depicts an inbox 322A of user 318 (e.g., "Joe Doe"). As illustrated, user 318 is composing message 308A in reading pane 306 (highlighted in list pane 304), where the compose message 308A is addressed to user 320 (e.g., "Kat Larsson"). In particular, user 318 has input a subject line 328, static text 326A-B, and link 314 into the compose message 308A. As illustrated, link 314 is a URL to a "YouTube™" video (e.g., linked content), as indicated by the website domain 330. Link 314 further includes a video ID (indicated by "v=") of "zQlawgxoox4." In aspects, when the messaging application receives link 314 in compose message 308A, the messaging application may evaluate link 314 to determine if a collaborative user experience (UX) is available for link 314. A collaborative UX that is available for link 314, the collaborative UX may be customized for a content type associated with the linked content associated with link 314. In aspects, evaluation of link 314 may involve parsing link 314 to identify the website domain 330 to determine the content type, which may be general or specific. In this case, the content type is video, generally, and "YouTube™" video, specifically.

If a collaborative UX is available for either the general content type or the specific content type, the messaging application may generate a prompt 316 indicating that a collaborative UX is available for link 314. For instance, as illustrated, prompt 316 may be in the form of a question (e.g., "Make this link collaborative?"); however, in other aspects, prompt 316 may be in the form of an informative feature notification (e.g., "Collaborating? Try a new live component! Collaborate on this link in real-time and share seamlessly across apps. Learn More"). Prompt 316 may further include a selectable element, such as check box 334, for approving or initiating conversion of link 314 into a collaborative UX. If user 318 selects check box 334 for accepting conversion of link 314 into a collaborative UX, the collaborative UX including the linked content (e.g., the YouTube video associated with website domain 330 and video ID 332) may be automatically rendered in compose message 308A. On the other hand, if user 318 does not desire link 314 to be converted, user 318 may decline or ignore the prompt 316 and proceed to complete and send compose message 308A in the traditional way including link 314.

Figure 3B:
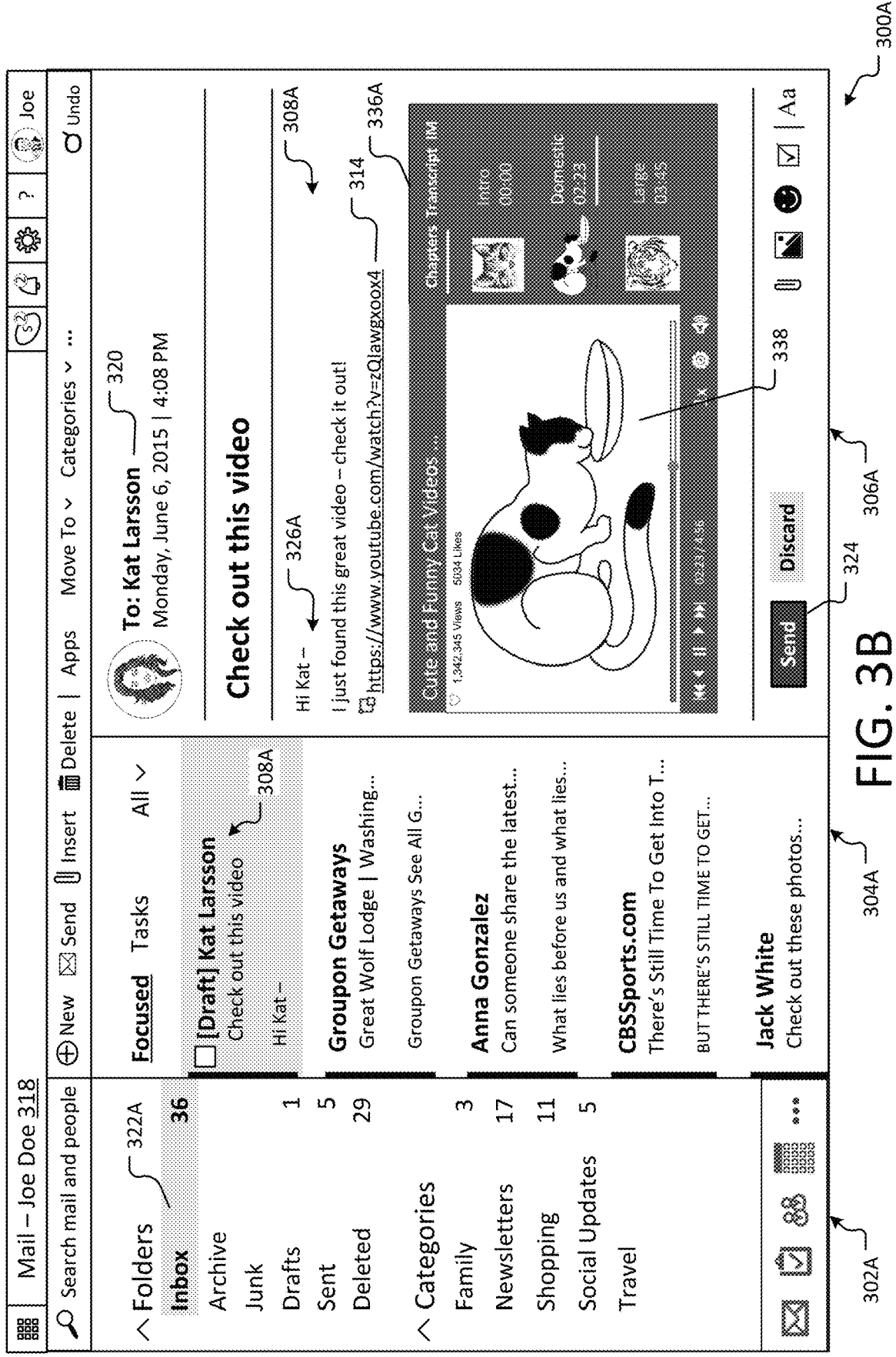

FIG. 3B depicts user interface 300A of the messaging application for converting a received link into a collaborative UX in a compose message, in accordance with examples of the present disclosure.

Similar to FIG. 3A, FIG. 3B illustrates user interface 300A including a navigation pane 320A, a list pane 304A, and a reading pane 306A. Here again, the user interface 300A depicts an inbox 322A of user 318 (e.g., "Joe Doe"). As illustrated, user 318 is composing message 308A (highlighted in list pane 304) addressed to user 320 (e.g., "Kat Larsson"). In this case, user 318 has selected check box 334 (not shown) to initiate conversion of link 314 and collaborative UX 336A has been rendered within compose message 308A. That is, the messaging application has retrieved the metadata, followed the code and load pointers to ingest the custom code and render the collaborative UX 336A within compose message 308A, and followed link 314 and/or configuration information (e.g., video ID 314, name field, etc.) to retrieve the linked content 338 (e.g., a YouTube video). In some aspects, the collaborative UX 338 may replace link 314 within compose message 308A (not shown); in other aspects, the collaborative UX 338 may be rendered along with link 314. As illustrated, the collaborative UX 338 is rendered in-line below static text 326A, with static text 326B being out of view in interface 300B). Upon selecting send button 324, user 318 (e.g., sender) may send compose message 308A to user 320 (e.g., recipient).

Figure 3C:
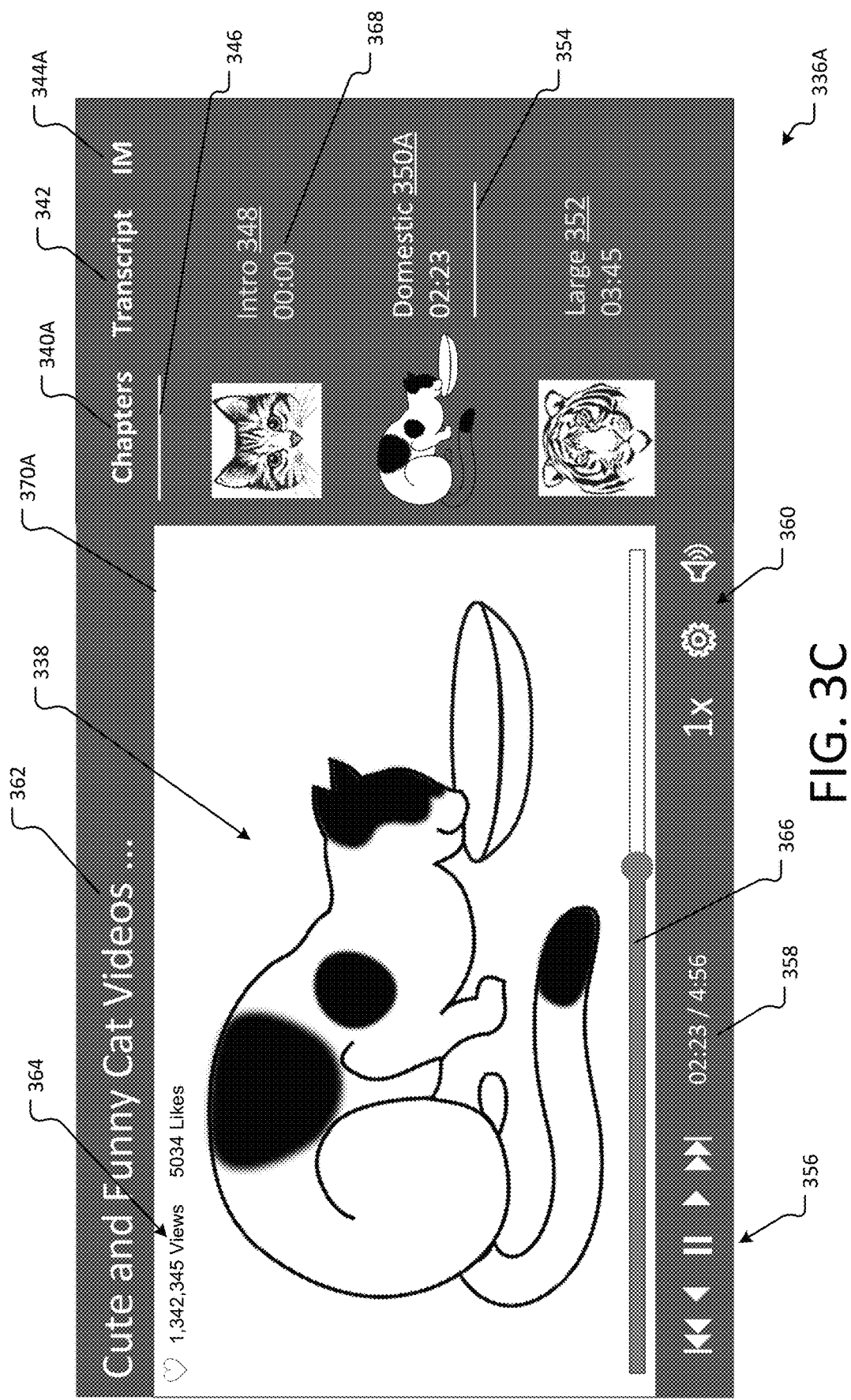

FIG. 3C depicts a collaborative UX 336A including linked content within a compose message, in accordance with examples of the present disclosure.

As illustrated, collaborative UX 336A comprises linked content 338. For instance, the linked content 338 may be provided within a content frame 370A (e.g., iFrame) in collaborative UX 336A. Moreover, the collaborative UX 336A may be customized for a content type of the linked content 338 (here, video type generally and YouTube type specifically). Since linked content 338 is a video, and a YouTube video in particular, collaborative UX 336A includes features and functionalities for interacting with a YouTube video. For instance, collaborative UX 336A includes a number of tabbed features, such as chapter tab 340A, transcript tab 342, and instant message (IM) tab 344A. In aspects, the chapter tab 340A may display selectable chapter divisions of the video, transcript tab 342 may display a transcript (e.g., a transcript queued to the video) based on a speech-to-text translation, and IM tab 344A may enable users to correspond via instant messages regarding the linked content 338, cropping the linked content 338, or otherwise.

As further illustrated, chapter tab 340A is selected, as illustrated by tab selection indicator 346, and a number of chapter divisions are displayed for the YouTube video. In an example, the chapter divisions include an intro chapter 348, a domestic chapter 350, and large chapter 352. Each chapter may also be associated with a start time 368, such as a "00:00" start time for the intro chapter 348, a "02:23" start time for the domestic chapter 350, and a "03:45" start time for large chapter 352. In the disclosed example, the domestic chapter 350 is selected, as illustrated by the chapter selection indicator 354, and the YouTube video is queued to the start time of "02:23" associated with the domestic chapter 350 in the content frame 370A.

The collaborative UX 336A also provides a number of controls for interacting with the video content type associated with linked content 338, such as navigation controls 356 and modulation controls 360 (e.g., play speed (e.g., 1x), settings icon, and volume control). Additional features associated with the video content type include progress time 358 and progress bar 366. Collaborative UX 336A may further provide features specific to a streaming video, such as title 362 and metrics 364 (e.g., including like selector, number of views, and number of likes). As should be appreciated, the described features and functionalities for a collaborative UX are exemplary only and should not be considered as limiting; indeed, any other suitable features or functionalities for interacting with a video may be provided in collaborative UX 336A.

Figure 3D:
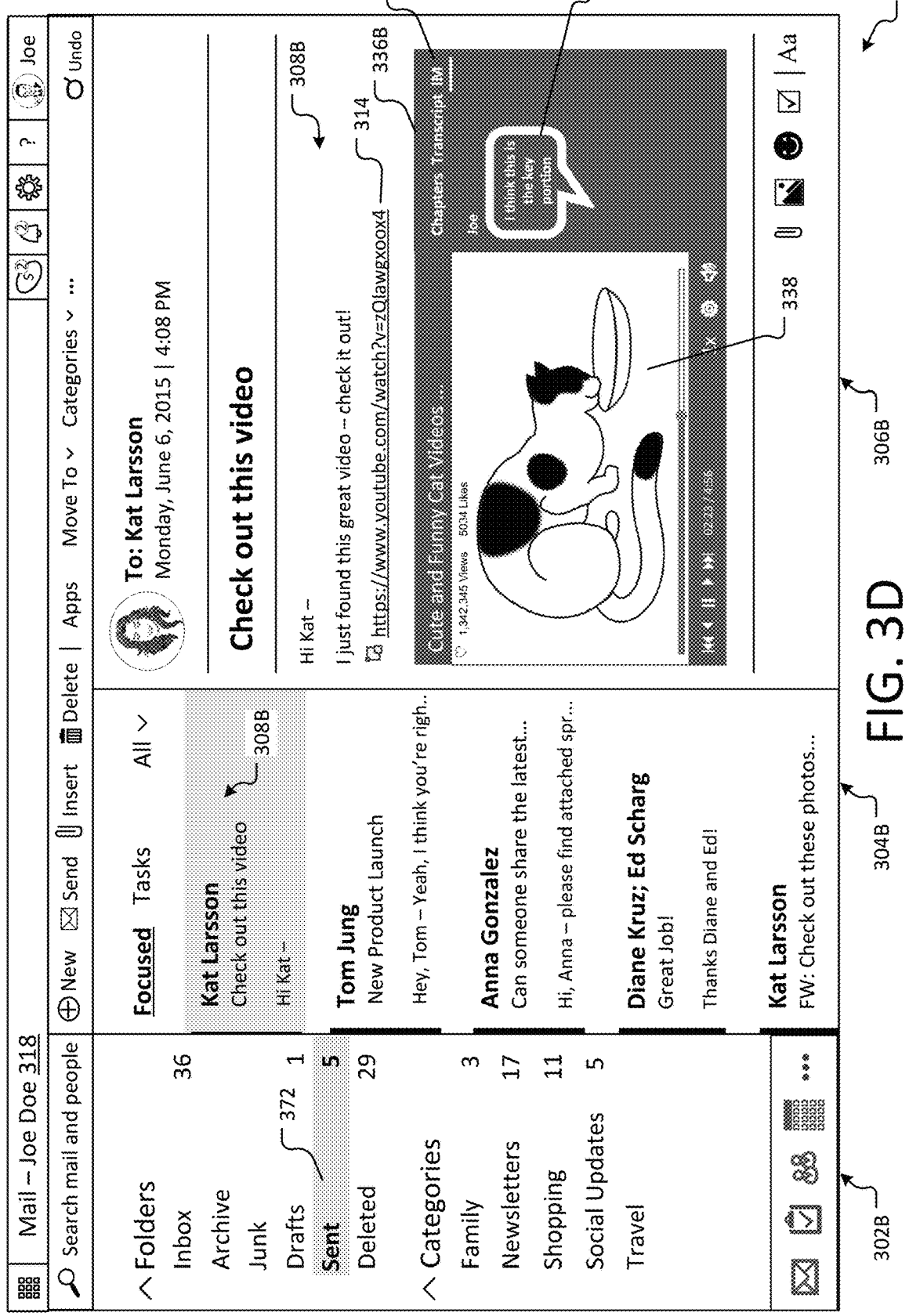

FIG. 3D depicts a user interface of the messaging application displaying a sent message including a collaborative UX, in accordance with examples of the present disclosure.

FIG. D illustrates user interface 300B including a navigation pane 320B, a list pane 304B, and a reading pane 306B. In this case, the user interface 300B depicts a sent folder 372 of user 318 (e.g., "Joe Doe"). As illustrated, user 318 is viewing sent message 308B (highlighted in list pane 304) that was sent to user 320 (e.g., "Kat Larsson"). As with compose message 308A, collaborative UX 336B is rendered within sent message 308B. That is, the messaging application retrieved the metadata associated with link 314 which was generated when user 318 initiated conversion of the link 314 into a collaborative UX 336B in compose message 308A. Based on the metadata, for example, the collaborative UX 336B is rendered within sent message 308B by retrieving the custom code, calling the code loader, and retrieving linked content 338 based on link 314 and/or the configuration information. As further illustrated, the IM tab 344B has been selected and user 318 has entered an instant message 374 for collaborating on the linked content 338.

Figure 3E:
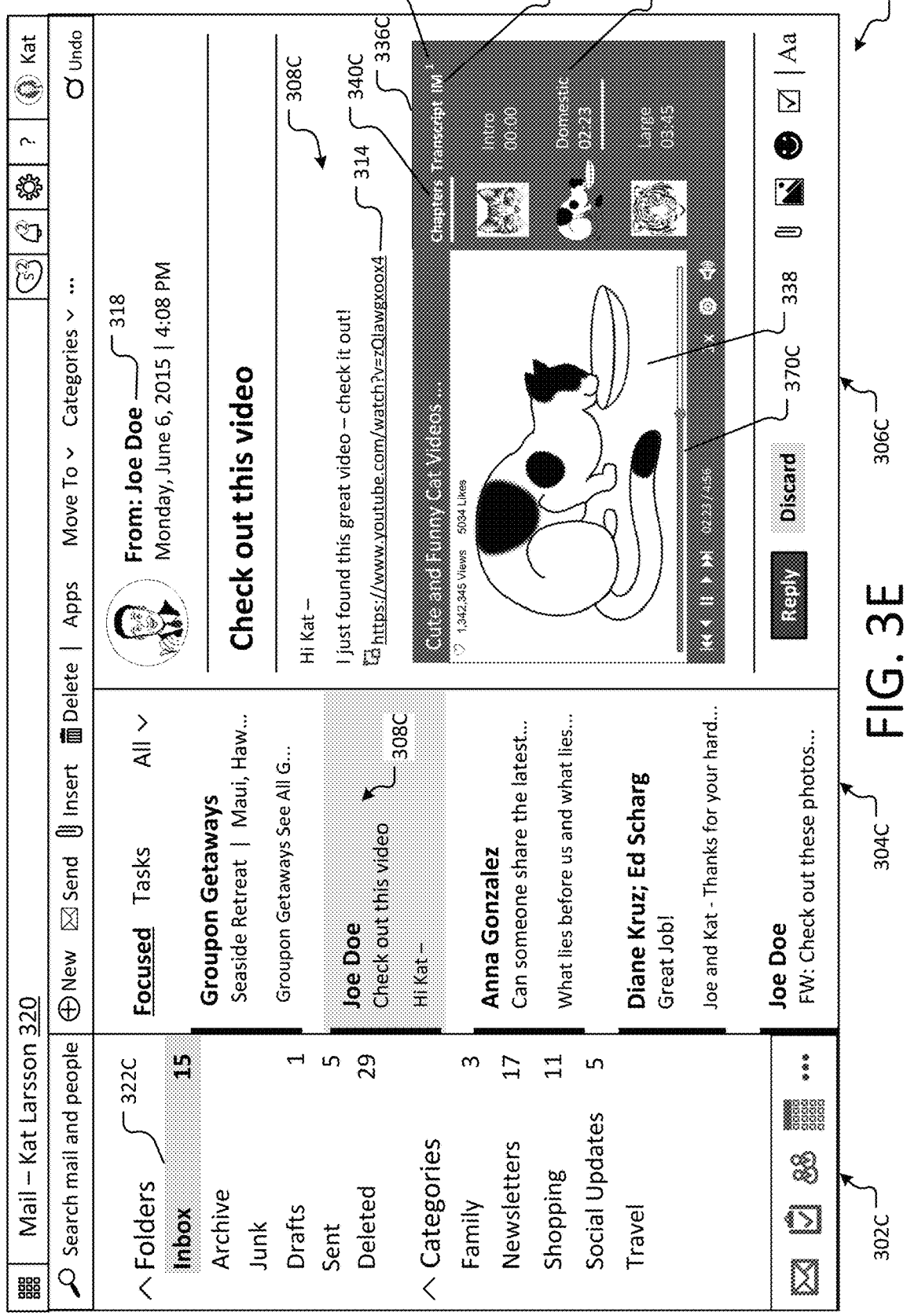

FIG. 3E depicts a user interface of a messaging application for receiving a message having a collaborative user experience (UX), in accordance with examples of the present disclosure.

FIG. 3E illustrates user interface 300C including a navigation pane 320C, a list pane 304C, and a reading pane 306C. User interface 300C displays an inbox 322C of user 320 (e.g., "Kat Larsson") wherein the user 320 is viewing received message 308C from user 318 (e.g., "Joe Doe") in reading pane 306C. As with the compose message 308A and sent message 308B, the received message 308C displays collaborative UX 336C. For example, upon receiving message 308C, the messaging application may render collaborative UX 336C by retrieving the metadata associated with link 314 and, based on the metadata, retrieving the custom code, calling the code loader, and retrieving linked content 338. As should be appreciated, since collaborative UX 336B is synchronized with any changes within the sent message 308B and collaborative UX 336C is synchronized with any changes within the received message 308C, user 318 (the sender) and user 320 (the recipient) are able to collaborate regarding the linked content 338B-C in near real-time without exchanging additional messages. That is, any changes made by either the sender via collaborative UX 336B or the recipient via collaborative UX 336C may be visible, in near real-time, to the other user.

As further illustrated by FIG. 3E, the chapter tab 340C and the domestic chapter 350C of the collaborative UX 336C have been selected by user 320. Accordingly, linked content 338 is queued to the start time of the domestic chapter 350C in the content frame 370C. Although the IM chapter tab 344C is not selected, a notification 378 corresponding to the instant message 374 input by user 318 in sent message 308B is indicated on IM tab 344C.

As should be appreciated, the various user interfaces, methods, devices, applications, features, etc., described with respect to FIGS. 3A-E are not intended to limit the user interface 300 to being performed by the particular applications and features described. Accordingly, additional configurations may be used to practice the methods and systems herein and/or features and applications described may be excluded without departing from the methods and systems disclosed herein.

FIGS. 4A-4E depict a user interface 400 of a messaging application for converting structured data into a collaborative user experience (UX), in accordance with examples of the present disclosure. In aspects, the messaging application depicted in FIGS. 4A-4E may be the same as or similar to the applications 104A-C depicted in FIG. 1 and applications 204A-C depicted in FIG. 2.

Figure 4A:
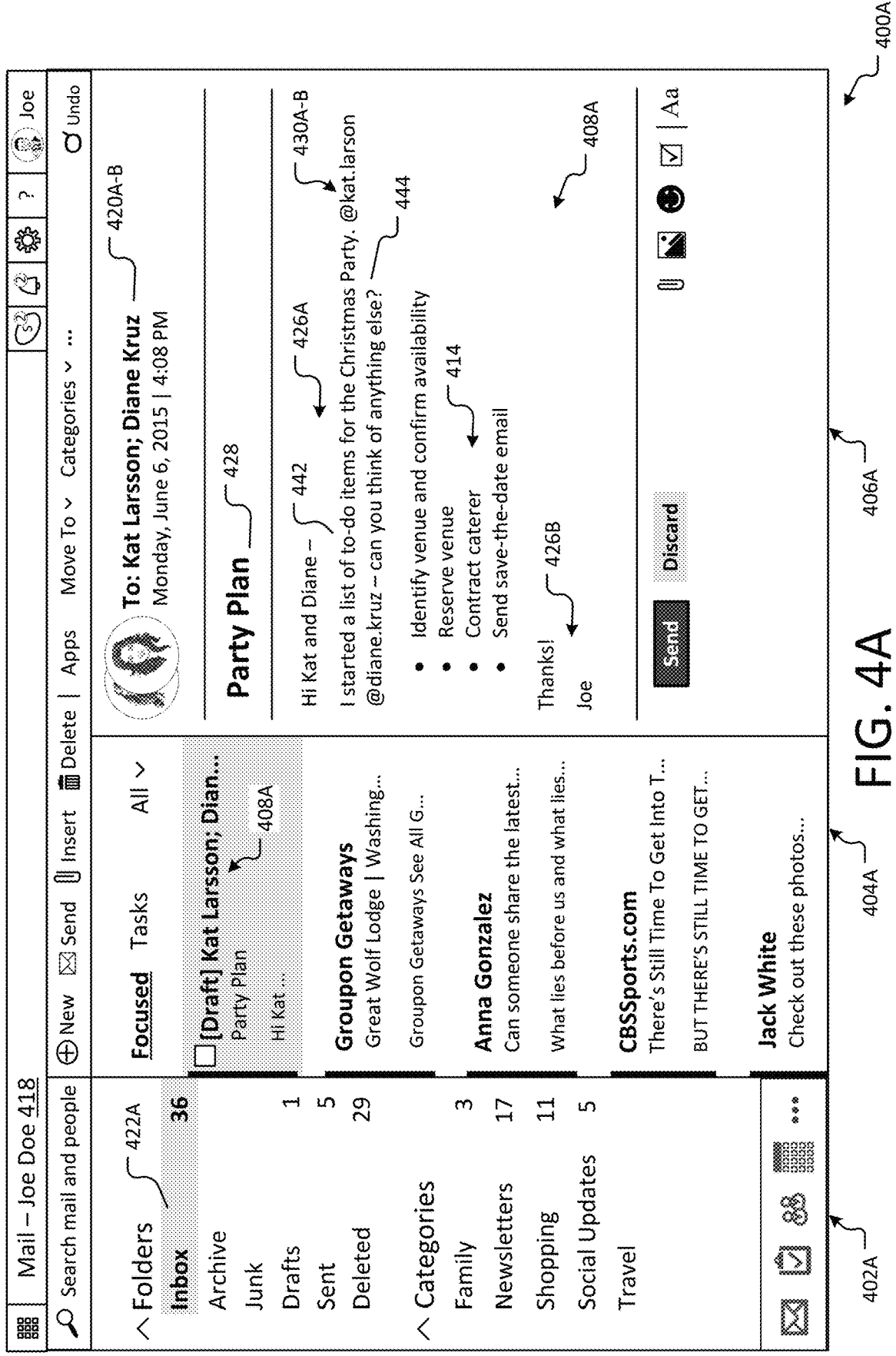

FIG. 4A depicts a user interface 400A of a messaging application (e.g., an email messaging application) for receiving structured data in a compose message, the user interface 400A including a navigation pane 420A, a list pane 404A, and a reading pane 406A, in accordance with examples of the present disclosure.

The user interface 400A of the messaging application depicts an inbox 422A of user 418 (e.g., "Joe Doe"). As illustrated, user 418 is composing message 408A in reading pane 406A (highlighted in list pane 404A), where the compose message 408A is addressed to users 420A-B (e.g., "Kat Larsson" and "Diane Kruz"). In particular, user 418 has input a subject line 428, text 426A-B, and structured data 414 into the compose message 408A. As illustrated, structured data 414 is a bulleted list. Further, as illustrated, the subject line 428, text 426A-B, and structured data 414 comprise static text and/or data. In an example, "static" refers to fixed or unchanging text and/or data, whereas "live" refers to dynamic or changing text and/or data (including text and/or data that changes in near real-time). That is, while the sender can continue to compose and edit text and/or data prior to sending a compose message, once the message is sent static text and/or static data becomes fixed in the sent message.

In aspects, when the messaging application receives compose message 408A, the messaging application may evaluate the subject line 428, text 426A-B, structured data 414, and any other aspects of compose message 408A to determine if user 418 intends to collaborate regarding the structured data 414. For instance, the messaging application may evaluate the subject line 428, text 426A-B, structured data 414 by applying machine learning to detect an intent to collaborate by user 418. In this case, the machine learning algorithm(s) may be trained to identify indications of an intent to collaborate, such as @mentions to other users (e.g., @mentions 430A-B), terms or phrases associated with collaboration (e.g., "decide," "choose," "vote," "confer," "brainstorm," "collaborate," "to-do list," and the like), open questions, voting buttons, and the like. In some cases, the structured data 414 may itself be an indication of an intent to collaborate (e.g., a numbered list of text strings each followed by a question mark).

As illustrated by FIG. 4A, the compose message 408A includes several indications of an intent to collaborate, including phrase 442 ("list of to-do items"), open question 444 ("can you think of anything else?"), and @mentions 430A-B ("@kat.larsson" and "@diane.kruz"). Based on one or more of these indications, the messaging application may determine that user 418 intends to collaborate regarding structured data 414. If so, the messaging application may determine whether a collaborative UX is available for structured data 414, as described with respect to FIG. 4B.

Figure 4B:
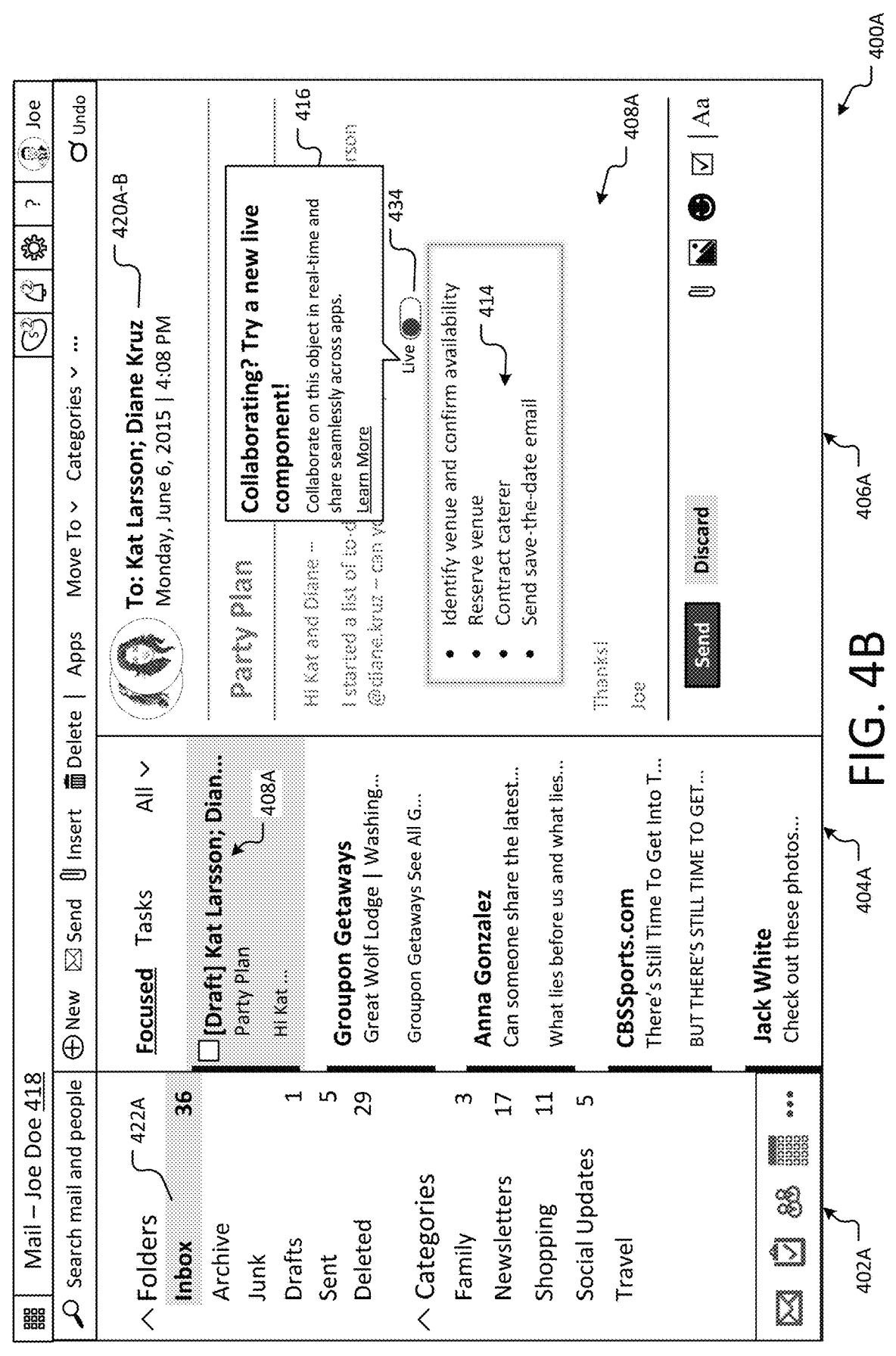

FIG. 4B depicts user interface 400A of the messaging application including a prompt for converting structured data into a collaborative UX in a compose message, in accordance with examples of the present disclosure.

Similar to FIG. 4A, FIG. 4B illustrates user interface 400A including a navigation pane 420A, a list pane 404A, and a reading pane 406A. Here again, the user interface 400A depicts an inbox 422A of user 418 (e.g., "Joe Doe"). As illustrated, user 418 is composing message 408A (highlighted in list pane 404A) addressed to users 420A-B (e.g., "Kat Larsson" and "Diane Kruz"). In response to determining an intent to collaborate by user 418 based on the analysis described with respect to FIG. 4A, the messaging application may determine whether a collaborative UX is available for structured data 414.

For example, the messaging application may evaluate the structured data 414 to identify a structured data type (e.g., bulleted list, numbered list, table, etc.) associated with the structured data 414. As illustrated, structured data 414 is a bulleted list data type. Based on identifying the bulleted list data type, the messaging application may determine whether a corresponding collaborative UX is available for structured data 414. In an example, a corresponding collaborative UX may refer to a collaborative UX that has been customized for a structured data type (here, a bulleted list data type). As detailed above, a collaborative UX customized for a particular structured data type may comprise an interactive data structure corresponding to the structured data type. That is, for a bulleted list data type, the interactive data structure may comprise a dynamic container for storing and updating data associated with a bulleted list; whereas for a table data type, the interactive data structure may comprise a dynamic container for storing and updating data associated with a table. In aspects, a collaborative UX customized for a particular structured data type may be associated with preconfigured metadata, including a pointer to custom code for building the collaborative UX and the associated interactive data structure, and a pointer to a code loader for ingesting the custom code and rendering the collaborative UX and the interactive data structure.

If the messaging application determines that such a customized collaborative UX is available for structured data 414, the messaging application may generate prompt 416 indicating that structured data 414 can be converted into a live experience. For instance, as illustrated, prompt 416 may be in the form of an informative feature notification (e.g., "Collaborating? Try a new live component! Collaborate on this link in real-time and share seamlessly across apps. Learn More"). Prompt 416 may further include a selectable element, such as slide button 434, for approving or initiating conversion of structured data 414 into a live (or collaborative) experience. If user 418 activates slide button 434 to convert structured data 414 into a collaborative UX, the collaborative UX may automatically be rendered and populated with the bulleted list in place of static structured data 414 in compose message 408A. On the other hand, if user 418 does not desire structured data 414 to be converted, user 418 may decline or ignore the prompt 416 and proceed to complete and send compose message 408A including structured data 414 in the traditional way.

Figure 4C:
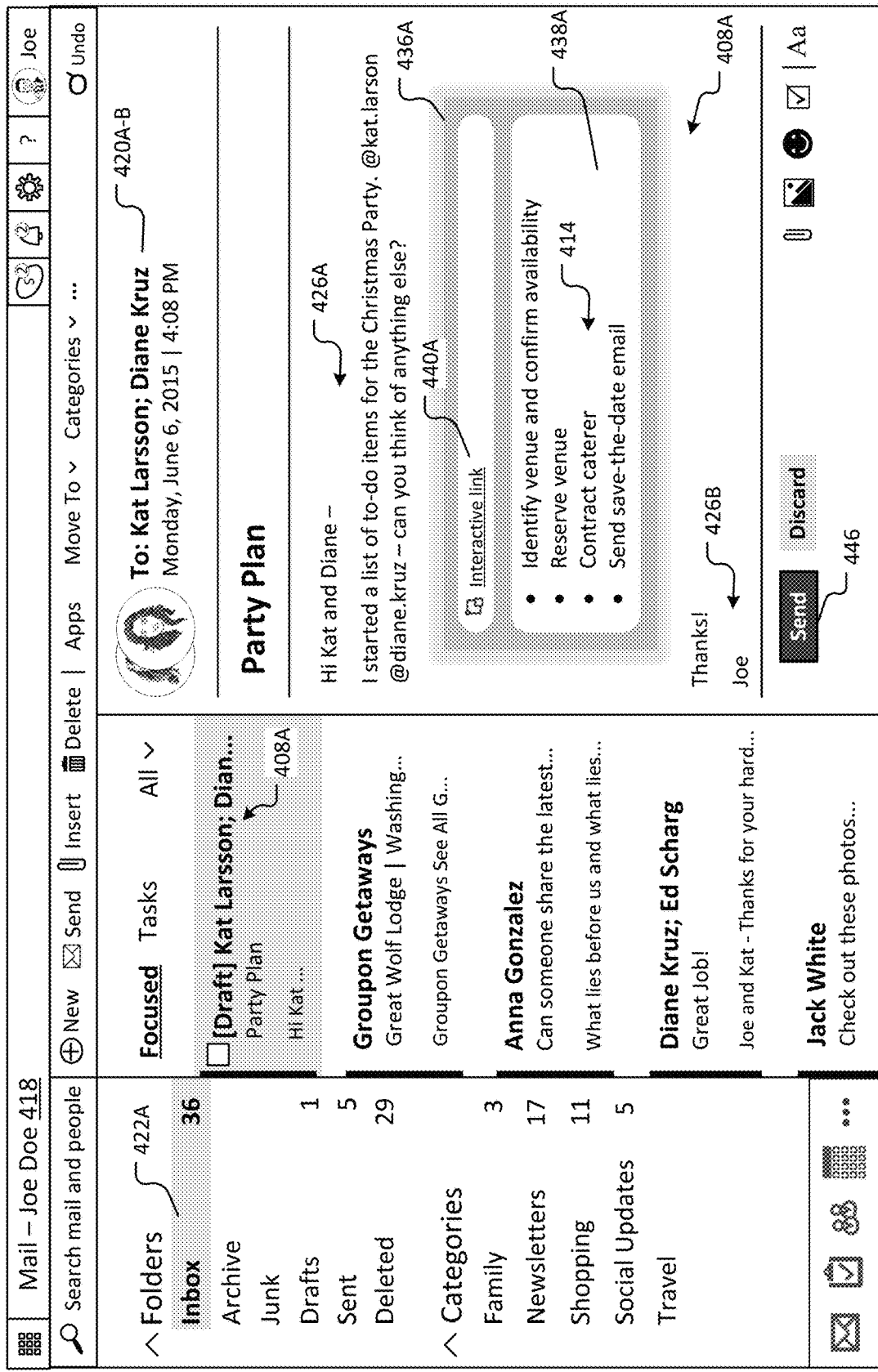

FIG. 4C depicts user interface 400A of the messaging application illustrating a collaborative UX in a compose message, in accordance with examples of the present disclosure.

Similar to FIGS. 4A-4B, FIG. 4C illustrates user interface 400A including a navigation pane 420A, a list pane 404A, and a reading pane 406A. Here again, the user interface 400A depicts an inbox 422A of user 418 (e.g., "Joe Doe"). As illustrated, user 418 is composing message 408A (highlighted in list pane 404A) addressed to users 420A-B (e.g., "Kat Larsson" and "Diane Kruz").

As illustrated, in response to user 418 activating slide button 434 (not shown), the messaging application has rendered collaborative UX 436A and interactive data structure 438A (populated with structured data 414) within compose message 408A. That is, the messaging application retrieved the preconfigured metadata associated with the corresponding collaborative UX, followed the code pointer to the custom code and followed the load pointer to the code loader to ingest the custom code and render the collaborative UX 436A and the interactive data structure 438A. Additionally, the messaging application populated the interactive data structure 438A with the structured data 414 (e.g., bulleted list). In some cases, as illustrated, an interactive link 440A may been generated and associated with the collaborative UX 436A. In aspects, the interactive link 440A may comprise the metadata associated with the collaborative UX 436A, for example, the code pointer to the custom code, the load pointer to the code loader, and the data pointer to the data associated with the integrated data structure 438A in storage (e.g., in a file associated with user 418 on a data host). As illustrated, the collaborative UX 436A is rendered in-line between static text 426A and static text 426B. Upon selecting send button 446, user 418 (e.g., sender) may send compose message 408A to users 420A-B (e.g., recipients).

Figure 4D:
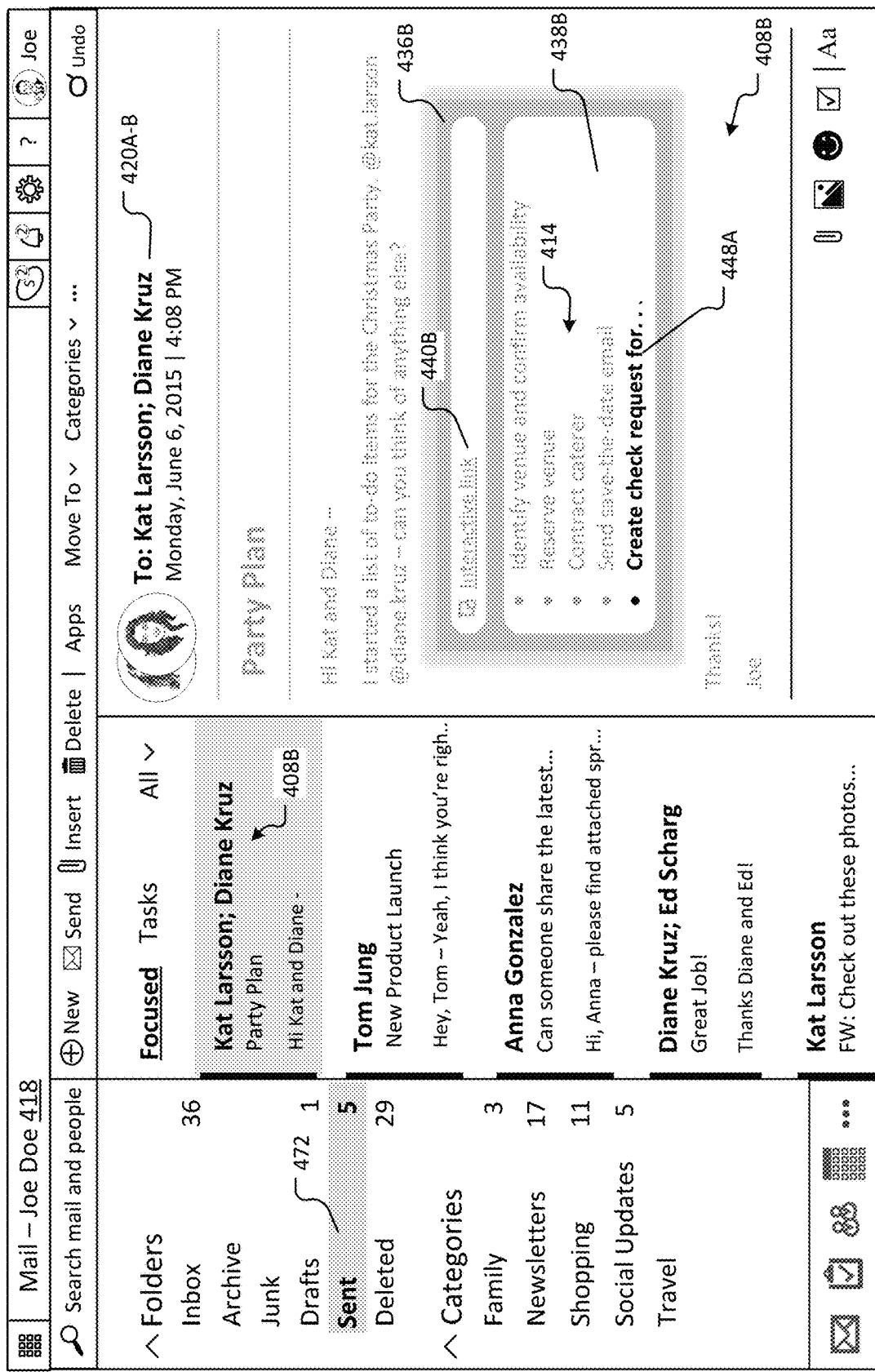

FIG. 4D depicts a user interface of the messaging application illustrating an update to a collaborative UX in a sent message, in accordance with examples of the present disclosure.

FIG. 4D illustrates user interface 400B including a navigation pane 420B, a list pane 404B, and a reading pane 406B. In this case, the user interface 400B depicts a sent folder 472 of user 418 (e.g., "Joe Doe"). As illustrated, user 418 is viewing a sent message 408B (highlighted in list pane 404B) that was sent to users 420A-B (e.g., "Kat Larsson" and "Diane Kruz"). As further illustrated, user 418 is editing the interactive data structure 438B by adding a new bullet 448 to the bulleted list associated with structured data 414. As indicated by the ellipsis, user 418 may be in the process, but not finished, with adding the new bullet 448.

As noted above, when the new bullet 448 is completed and added to the interactive data structure 438B, the messaging application may cause the stored data associated with the interactive data structure 438B to be updated with the new bullet 448. For instance, the messaging application may follow a data pointer associated with the interactive link 440B to a storage component comprising data associated with the interactive data structure 438B. When the data associated with the interactive data structure 438B is updated in storage, other corresponding interactive data structures 438 in other messages or applications are synchronized to reflect the update (e.g., the new bullet 448) in near real-time.

FIG. 4E depicts a user interface of a messaging application for receiving a message having a collaborative user experience (UX), in accordance with examples of the present disclosure.

FIG. 4E illustrates user interface 400C including a navigation pane 420C, a list pane 404C, and a reading pane 406C. User interface 400C displays an inbox 422C of user 420A (e.g., "Kat Larsson") wherein the user 420A is viewing received message 308C from user 418 (e.g., "Joe Doe") in reading pane 406C. As with the compose message 408A and sent message 408B, the received message 408C displays collaborative UX 436C and interactive data structure 438C. For example, upon receiving message 408C, the messaging application may render collaborative UX 436C by retrieving the metadata associated with interactive link 440C and, based on the metadata, retrieving the custom code, calling the code loader, and retrieving the data associated with interactive data structure 438C. Accordingly, the interactive data structure 438C displays the bulleted list associated with structured data 414. Moreover, interactive data structure 438C displays at least a portion of the new bullet 448B being added by user 418 to interactive data structure 438B in sent message 408B. That is, as detailed above, when user 420A (the recipient) is viewing received message 408C while user 418 (the sender) is adding the new bullet 448A in sent message 408B, user 420A is able to view the addition of new bullet 448B in near real-time.

As illustrated by FIG. 4D, user 418 is in the process of adding the new bullet 448A to interactive data structure 438B and an incomplete portion of new bullet 448A is displayed (indicated by the ellipsis). Accordingly, as illustrated by FIG. 4E, interactive data structure 438C also displays an incomplete portion of new bullet 448B as well as a cursor 450 indicating that user 418 ("Joe") is in the process of adding new bullet 448A to interactive data structure 438B. As noted above, user 420A is able to view the addition of new bullet 448B in near real-time. For example, a slight time delay between user 418 inputting the new bullet 448A into interactive data structure 438B and user 420B viewing the addition of new bullet 448B in interactive data structure 438C is illustrated by new bullet 448A being slightly more complete than new bullet 448B.

As should be appreciated, the various user interfaces, methods, devices, applications, features, etc., described with respect to FIGS. 4A-E are not intended to limit the user interface 400 to being performed by the particular applications and features described. Accordingly, additional configurations may be used to practice the methods and systems herein and/or features and applications described may be excluded without departing from the methods and systems disclosed herein.

Figure 5A:
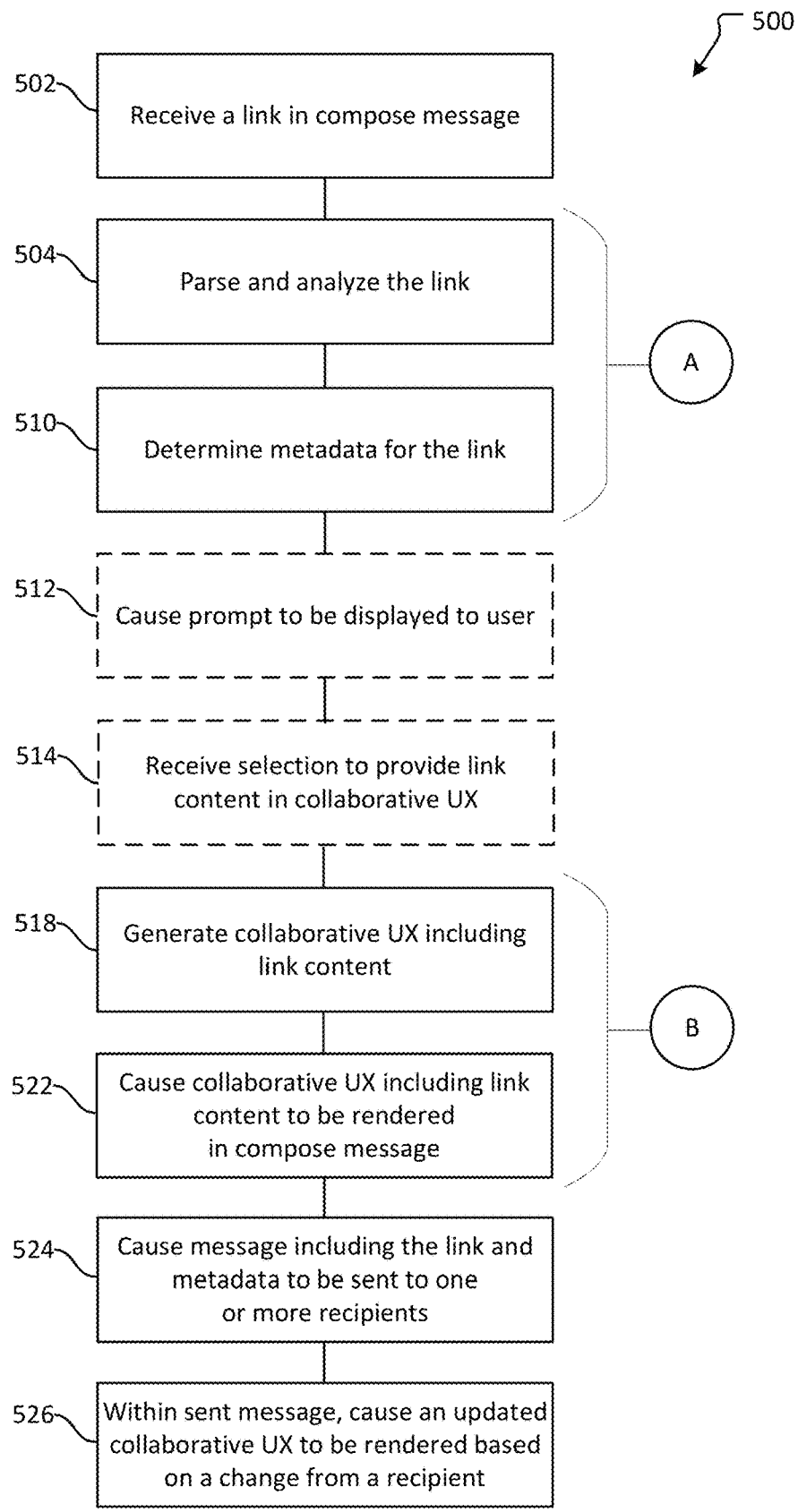
FIGS. 5A-C illustrate an example method for converting a link into a collaborative user experience (UX), in accordance with aspects of the present disclosure.
Figure 5B:
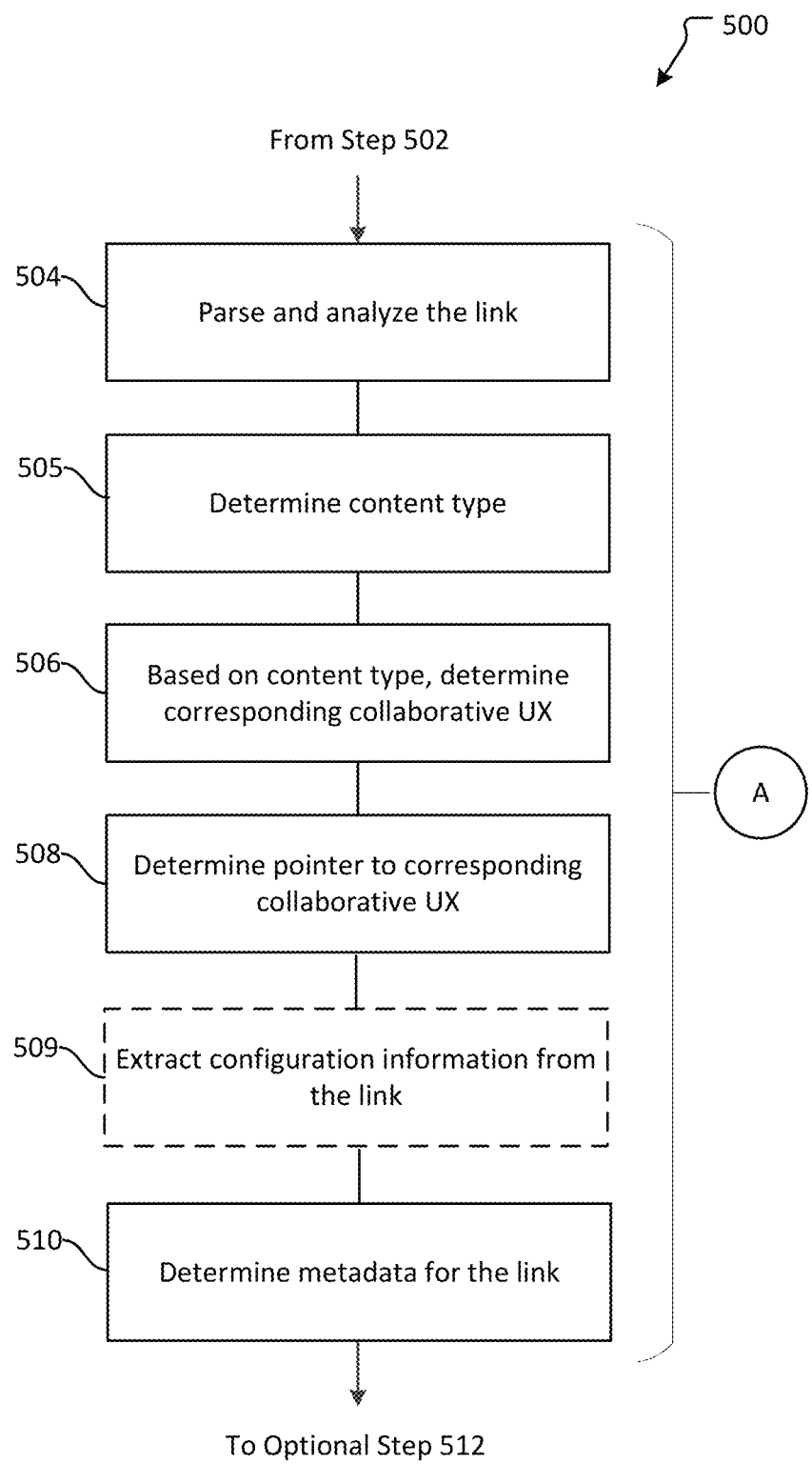
Figure 5C:
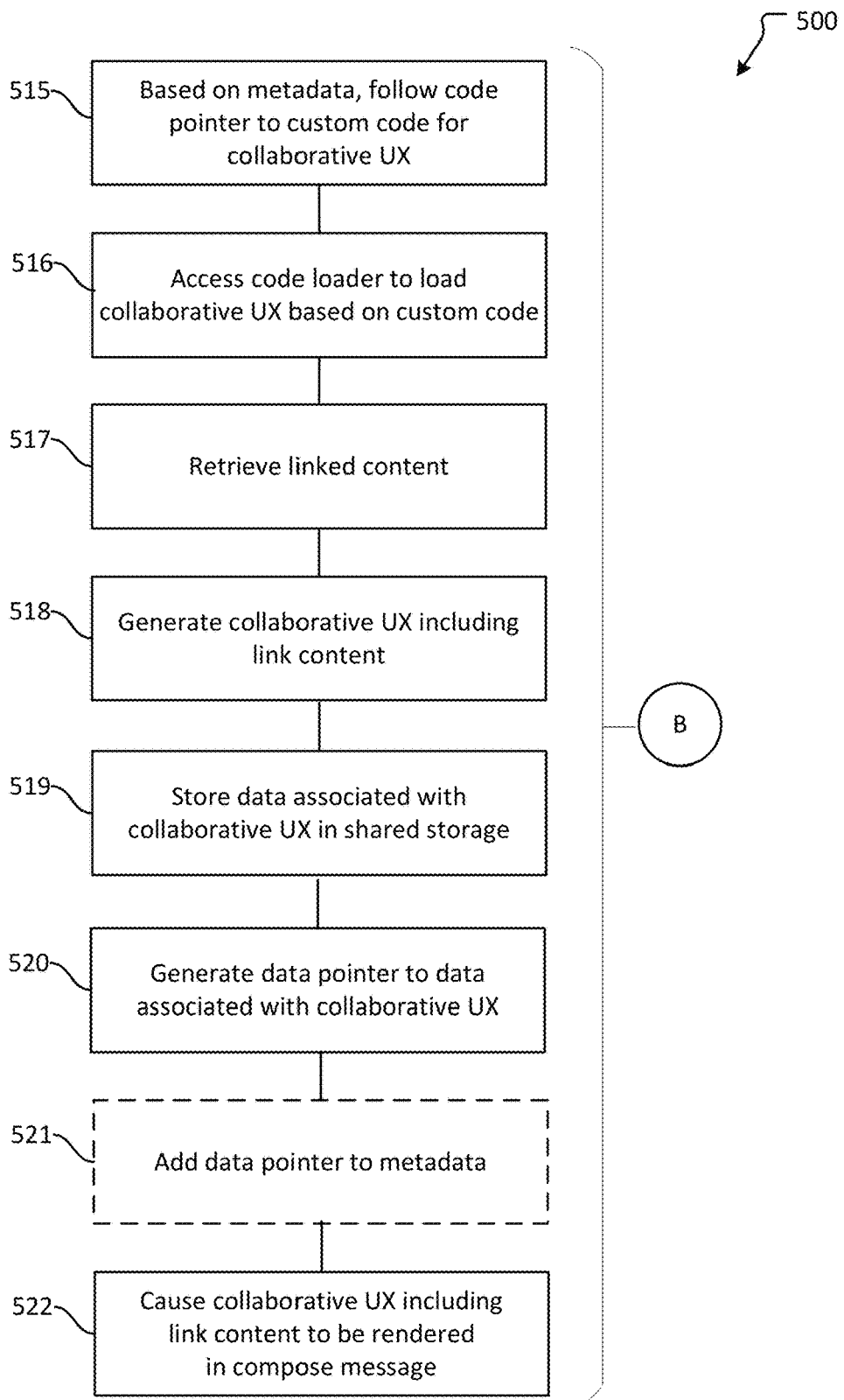

FIGS. 5A-C illustrate an example method for converting a link into a collaborative user experience (UX), in accordance with aspects of the present disclosure. FIG. 5A illustrates a general method for converting a link into a collaborative user experience (UX), in accordance with aspects of the present disclosure.

A general order of the operations for the method 500 is shown in FIGS. 5A-C. The method 500 may include more or fewer steps and/or may progress in a different order of steps from those shown in FIGS. 5A-C. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, user interfaces, modules, software, data structures, data characteristic representations, signaling diagrams, methods, etc., described in conjunction with FIGS. 1-4E and 6A-12B.

At receive operation 502, a link may be received into a compose message. A compose message is a message that is being composed by a user prior to sending the message (e.g., an email message, chat message, text message, social thread, or the like). A link is an identifier, a pathway or a pointer to content (e.g., document, video, image, streaming content, file, and the like) that is stored elsewhere (e.g., in a file, on a website, in a database, in local memory, in cloud memory, and the like).

At parse operation 504, the link may be parsed and analyzed. In aspects, the link may be parsed (or deciphered) to identify link parameters. For instance, for the link https://www.youtube.com/watch?v=zQIawgxoox4, at least a website domain of "youtube" and a video ID of "zQIawgxoox4" may be extracted from the link. These extracted link parameters may be evaluated to determine that the content type of the linked content is a generally a "video type" and more specifically a "YouTube video type." Additionally, based on the video ID, the particular video can be retrieved and viewed on the YouTube website.

At determine metadata operation 510, metadata for the link may be determined. For example, based on the content type determined for the link, it may be determined whether a collaborative user experience (UX) is available for the content type. In aspects, a collaborative UX may be customized based on the content type of linked content. That is, a first collaborative UX customized for one content type (e.g., a document) may include collaborative features and functionalities specific to documents, such as editing functionality, location tracking for different users editing the document, collaboration thread functionality, etc.; whereas a second collaborative UX for another content type (e.g., a video) may include other collaborative features and functionalities specific to videos, such as video start/end time settings, chapter navigation controls, video play controls, queued transcription functionality, collaboration thread functionality, etc.

At optional prompt operation 512, when a collaborative UX is identified for the content type of the linked content, a prompt may optionally be provided indicating that a collaborative UX is available for the link. For instance, the prompt may be in the form of a question (e.g., "Make this link collaborative?"); in other aspects, the prompt may be in the form of an informative feature notification (e.g., "Collaborating? Try a new live component! Collaborate on this link in real-time and share seamlessly across apps. Learn More"). The prompt may further include a selectable element, such as check box, an accept button, a slide button, and the like, for approving or initiating conversion of link into the collaborative UX. In other aspects, if a collaborative UX is identified for the content type of the linked content, the link may automatically be converted into a collaborative UX.

At optional select operation 514, when a selectable element is provided with the prompt, a user may select the selectable element to accept or initiate conversion of the link to a collaborative UX.

At generate UX operation 518, the collaborative UX may be generated. For instance, based on the metadata, the code pointer to custom code may be followed and the code loader may be called to ingest the custom code and retrieve the linked content (e.g., based on the link, the video ID) to generate the collaborative UX with the linked content. Additionally, a data pointer to a storage location may be created to store data associated with the collaborative UX (e.g., for synchronizing any updates to the collaborative UX, such as edits to or comments regarding the linked content).

At render operation 522, the collaborative UX with the linked content may be rendered in the compose message. In some aspects, the collaborative UX may be rendered in place of the link; in other aspects, the collaborative UX may be rendered along with the link. In further aspects, the collaborative UX may be rendered in-line (e.g., above, below, or between) with static text within the compose message.

At send operation 524, the compose message including the collaborative UX with the linked content may be sent by a sender to one or more recipients.

At update operation 526, in a sent message corresponding to the compose message, the collaborative UX may be synchronized to reflect a change to the collaborative UX made by a recipient in a received message. That is, as described above, both the sender and the one or more recipients are able to collaborate in near real-time regarding linked content via the collaborative UX within a sent message or a received message. In this way, since collaborative UXs are updated within the sent and received messages, the sender and the first recipient are not required to exchange additional messages and/or navigate away from the context of the messaging application.

In aspects, parse operation 504 and determine operation 510 are detailed further with respect to FIG. 5B (as indicated by "A"), and generate UX operation 518 and render operation 522 are detailed further with respect to FIG. 5C (as indicated by "B").

FIG. 5B illustrates a sequence of operations for parse operation 504 and determine metadata operation 510 of method 500 associated with FIG. 5A, in accordance with aspects of the present disclosure.

Again, at parse operation 504, the link may be parsed and analyzed. In aspects, the link may be parsed (or deciphered) to identify link parameters, such as a domain, video ID, name field, etc. For instance, for the link https://www.youtube.com/watch?v=zQIawgxoox4, at least a website domain of "youtube" and a video ID of "zQIawgxoox4" may be extracted from the link.

At determine type operation 505, a content type for the linked content may be determined. For example, link parameters such as website domain, name field, content ID (e.g., video ID) may be evaluated to determine the content type of the linked content. Moreover, content type may be general or specific. For a YouTube video, for example, the general content type may be "video type"; whereas specific content type may be "YouTube video type." In contrast, for a Microsoft Stream video, the general content type may still be "video type," but the specific content type may be "Stream video type."

At determine UX operation 506, based on the content type determined for the link, it may be determined whether a collaborative user experience (UX) is available for the content type. As detailed above, a collaborative UX may be customized based on the general content type of linked content. That is, a first collaborative UX customized for one content type (e.g., a document) may include collaborative features and functionalities specific to documents, such as editing functionality, location tracking for different users editing the document, collaboration thread functionality, etc.; whereas a second collaborative UX for another content type (e.g., a video) may include other collaborative features and functionalities specific to videos, such as video start/end time settings, chapter navigation controls, video play controls, queued transcription functionality, collaboration thread functionality, etc. Thus, these customized features and functionalities associated with a particular collaborative UX enable users to not only collaborate with one another in different ways, but also to interact with the different types of content in different ways. Additionally, a collaborative UX may be customized for a specific content type that is of the same general content type (e.g., a YouTube™ video versus a Microsoft Stream™ video versus a Vimeo™ video).

At determine pointer operation 508, if a collaborative UX is available (e.g., has been customized or built) for the content type of the linked content, a code pointer may be determined for custom code associated with the collaborative UX, as well as a load pointer to a code loader for rendering the collaborative UX. In aspects, the term "pointer" may generally refer to a locator for information (here, the custom code or the code loader).

At optional extract operation 509, configuration information may be extracted from the link. For example, based on parsing the link, link parameters may be extracted or determined from the link, such as a domain, video ID, name field, etc. In some cases, the configuration information may provide additional information for loading the linked content in the collaborative UX. For instance, for the link https://www.youtube.com/watch?v=zQIawgxoox4, at least a website domain of "youtube" and a video ID of "zQIawgxoox4" may be extracted from the link.

Again, at determine metadata operation 510, metadata for the link may be determined (or compiled). For instance, the metadata may include the configuration information for the link (e.g., video ID, website domain, name field), a pointer to the custom code for the collaborative UX, and a pointer to the code loader for ingesting the metadata and rendering the collaborative UX. In some aspects, the metadata may further be associated with or appended to the link.

FIG. 5C illustrates a sequence of operations for generate UX operation 518 and render operation 522 of method 500 associated with FIG. 5A, in accordance with aspects of the present disclosure.

At follow operation 515, based on the metadata, the code pointer may be followed to retrieve the custom code for the collaborative UX. In aspects, a collaborative UX customized for the linked content may be encoded by the custom code. For example, the custom code may encode features and functionalities specific to interacting with the general content type and/or the specific content type of the linked content.

At access operation 516, further based on the metadata, a load pointer may be followed to access a code loader for ingesting the custom code and loading the collaborative UX.

At retrieve operation 517, the linked content may be retrieved based on the link and/or configuration information associated with the metadata, such as the video ID, name field, etc.

Again, at generate UX operation 518, the code loader may ingest the metadata to load the collaborative UX with the linked content. For example, the linked content may be provided within a frame (e.g., iFrame) of the collaborative UX.

At store operation 519, data associated with the collaborative UX may be stored in shared storage. For example, the data may be stored in a storage component (e.g., file) associated with a sending user on a data host. Data associated with the collaborative UX may include any user collaborations, including instant messages between users regarding the linked content, settings or changes to the linked content (e.g., start/end time croppings of a video, edits to a document, speed setting of a video, etc.), transcriptions of the linked content (e.g., of linked audio or video), and the like.

At generate pointer operation 520, a data pointer to a storage location may be created for the data associated with the collaborative UX. The data pointer may be followed to load the collaborative UX as well as to synchronize any updates to the collaborative UX, such as changes to and/or comments regarding the linked content.

Again, at render operation 522, the collaborative UX with the linked content may be rendered in a compose message. In some aspects, the collaborative UX may be rendered in place of the link; in other aspects, the collaborative UX may be rendered along with the link. In further aspects, the collaborative UX may be rendered in-line (e.g., above, below, or between) with static text within the compose message.

As should be appreciated, operations 502-526 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6A:
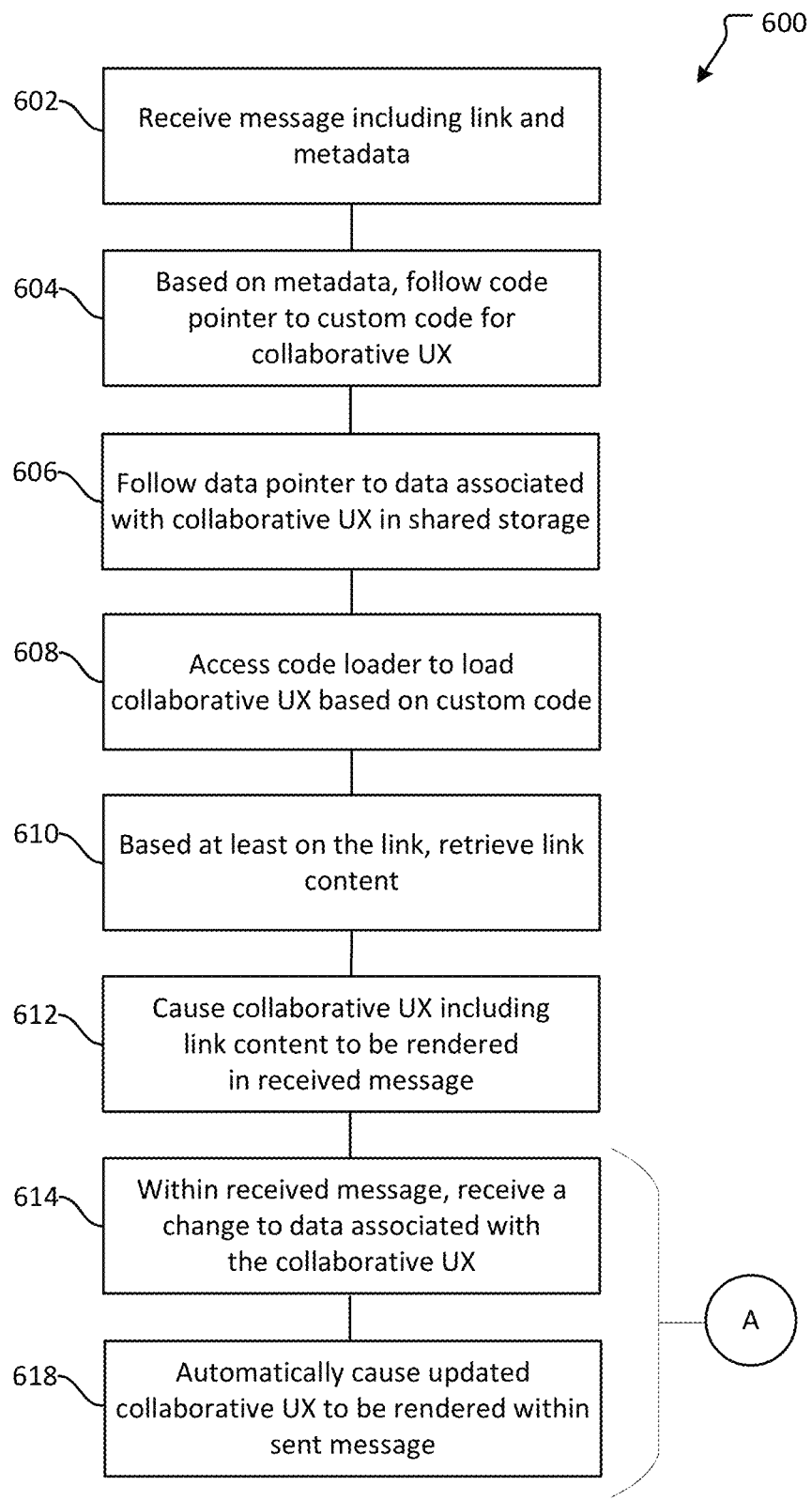
FIGS. 6A-B illustrate an example method for receiving a message including a link and metadata, in accordance with aspects of the present disclosure.
Figure 6B:
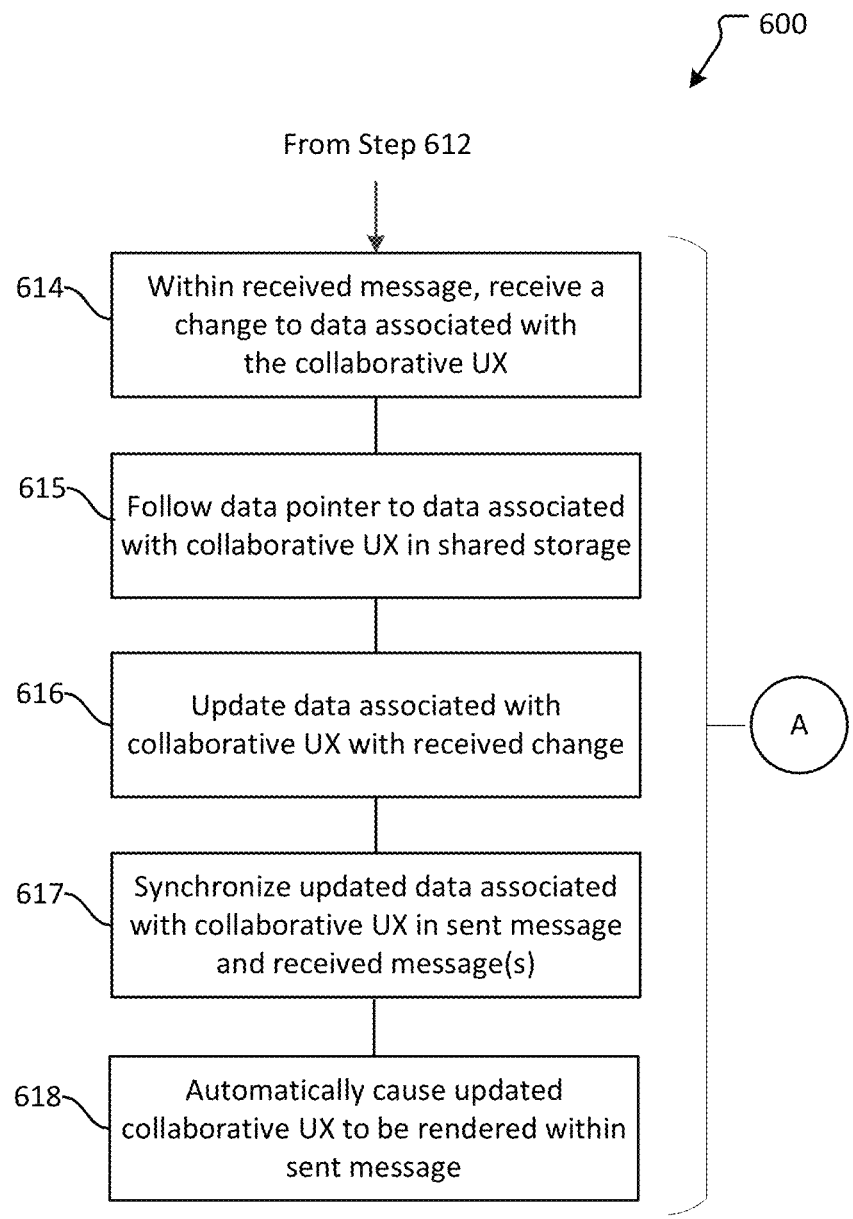

FIGS. 6A-B illustrate an example method for receiving a message including a link and metadata, in accordance with aspects of the present disclosure. FIG. 6A illustrates a general method for receiving the message including the link and metadata, in accordance with aspects of the present disclosure.

A general order of the operations for the method 600 is shown in FIGS. 6A-B. The method 600 may include more or fewer steps and/or may progress in a different order of steps from those shown in FIGS. 6A-B. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, user interfaces, modules, software, data structures, data characteristic representations, signaling diagrams, methods, etc., described in conjunction with FIGS. 1-5C and 7A-12B.

At receive message operation 602, a message may be received by a messaging application of a recipient user. In aspects, the message may include a link to content and associated metadata.

At follow operation 604, based on the metadata, the messaging application of the recipient may follow a code pointer to retrieve custom code for a collaborative UX associated with the link. If the messaging application of the recipient is unable to understand the metadata, the messaging application may simply render the link within the received message. In this case, the messaging application may be a legacy version of the messaging application used by the sender (e.g., a local version of Microsoft Outlook versus Outlook Web Access) or the messaging application may be a different type of messaging application from the messaging application used by the sender (e.g., Microsoft Outlook versus Gmail), for example.

At follow operation 606, a data pointer associated with the metadata or the link may be followed to retrieve data associated with a collaborative UX. Data associated with the collaborative UX may include any user collaborations, including instant messages between users regarding the linked content, settings or changes to the linked content (e.g., start/end time croppings of a video, edits to a document, speed settings of a video, etc.), a transcription of the linked content (e.g., of linked audio or video), and the like.

At access operation 608, further based on the metadata, the messaging application may follow a load pointer to access a code loader for ingesting the custom code and loading the collaborative UX.

At retrieve operation 610, the messaging application may retrieve linked content based on the link and/or configuration information associated with the metadata, such as the video ID, name field, etc.

At render operation 612, the messaging application may render a collaborative UX with the linked content in the received message. In some aspects, the collaborative UX may be rendered without displaying the link; in other aspects, the collaborative UX may be rendered along with the link. In further aspects, the collaborative UX may be rendered in-line (e.g., above, below, or between) with static text within the received message. Furthermore, since the linked content is provided within the collaborative UX (e.g., within a content frame), the recipient need not navigate away from the messaging application to view the linked content. That is, the recipient is able to view the linked content within the received message rather than following the link to another application (e.g., word processing application) or website (e.g., YouTube, Microsoft Stream, Vimeo, etc.) to view the linked content. Additionally, since the linked content is provided within the collaborative UX, the recipient is able to collaborate regarding the linked content within the received message rather than exchanging additional messages (e.g., reply or reply all) to collaborate on or make changes to the structured data.

At change operation 614, the messaging application may receive a change to the data associated with the collaborative UX in the received message. In an example, a change may include edits, additions, or deletions of data. For example, the recipient may edit the data (e.g., change a start time of a video, make an edit to a document, add content to a document, etc.) or send an instant message to the sender and/or another recipient regarding the linked content, for example.

At automatic operation 618, the received change within the collaborative UX may be automatically synchronized with the data in storage associated with the collaborative UX, e.g., by again following the data pointer. When the data is synchronized with the change in storage, the change may also be pushed to any related collaborative UXs, e.g., within the sent message and any other received messages. In this way, an updated collaborative UX may automatically be rendered within the sent message in near real-time. In this way, additional message exchanges between the recipient and the sender (and any other recipients) are not necessary to promulgate the change.

In aspects, change operation 614 and automatic operation 618 are detailed further with respect to FIG. 6B (as indicated by "A").

FIG. 6B illustrates a sequence of operations for change operation 614 and automatic operation 618 of method 600 associated with FIG. 6A, in accordance with aspects of the present disclosure.

Again, at change operation 614, the messaging application may receive a change to the data associated with the collaborative UX in the received message. In an example, a change may include edits, additions, or deletions of data. For instance, the recipient may wish to collaborate on a particular portion of a video and may change a start time, and/or the recipient may begin or add to an instant messaging thread within the collaborative UX, and/or the recipient may edit the linked content by adding, deleting, or revising the linked content (e.g., a document), and the like. Again, since the linked content is provided within the collaborative UX, the recipient is able to make the change within the received message rather than exchanging additional messages to collaborate on or make changes to the linked content.

At follow pointer operation 615, the messaging application may follow the data pointer to the data associated with the collaborative UX in storage. As noted above, the data associated with the collaborative UX may include any user collaborations (e.g., instant messages between users regarding the linked content), settings or changes to the linked content (e.g., start/end time croppings of a video, edits to a document, speed settings of a video, etc.), transcriptions of the linked content (e.g., of linked audio or video), and the like.

At update operation 616, the data associated with the collaborative UX may be updated in storage based on the change received from the recipient. In aspects, the update operation 616 may occur when the change is received such that the data in storage may be updated in near real-time.

At synchronize operation 617, the updated data associated with the collaborative UX in storage may be synchronized (or pushed out) to any related collaborative UXs, e.g., within the sent message and any other received messages. In aspects, the synchronize operation 617 may occur when the update to the data in storage is received such that the related collaborative UXs are updated in near real-time.

Again, at automatic operation 618, the received change within the collaborative UX may synchronized such that an updated collaborative UX is automatically rendered within the sent message (and any other received messages) in near real-time. In this case, additional message exchanges between the recipient and the sender (and any other recipients) are not necessary to promulgate the change.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7A:
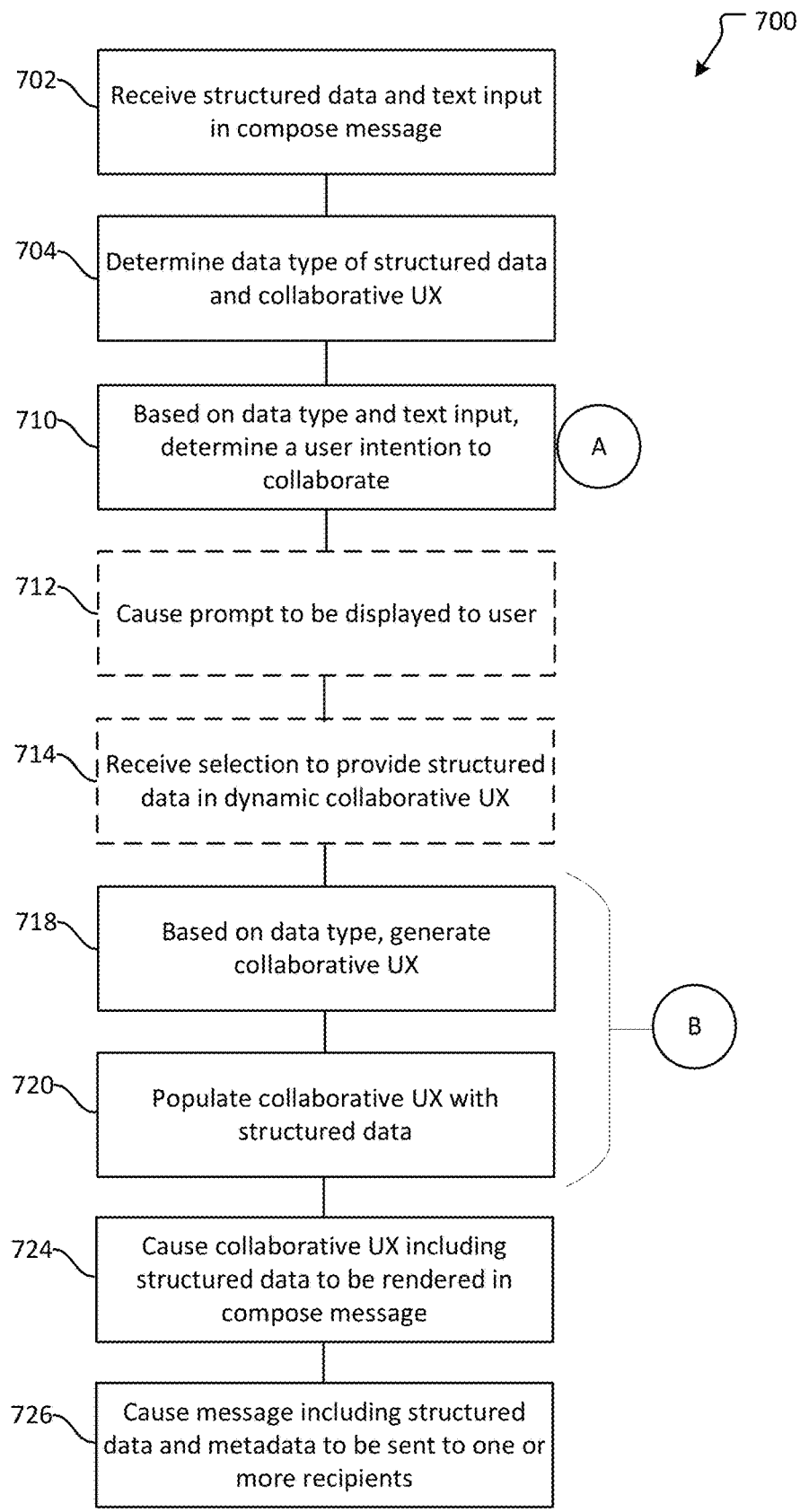
FIGS. 7A-C illustrate a first example method for converting structured data into a collaborative user experience (UX), in accordance with aspects of the present disclosure.
Figure 7B:
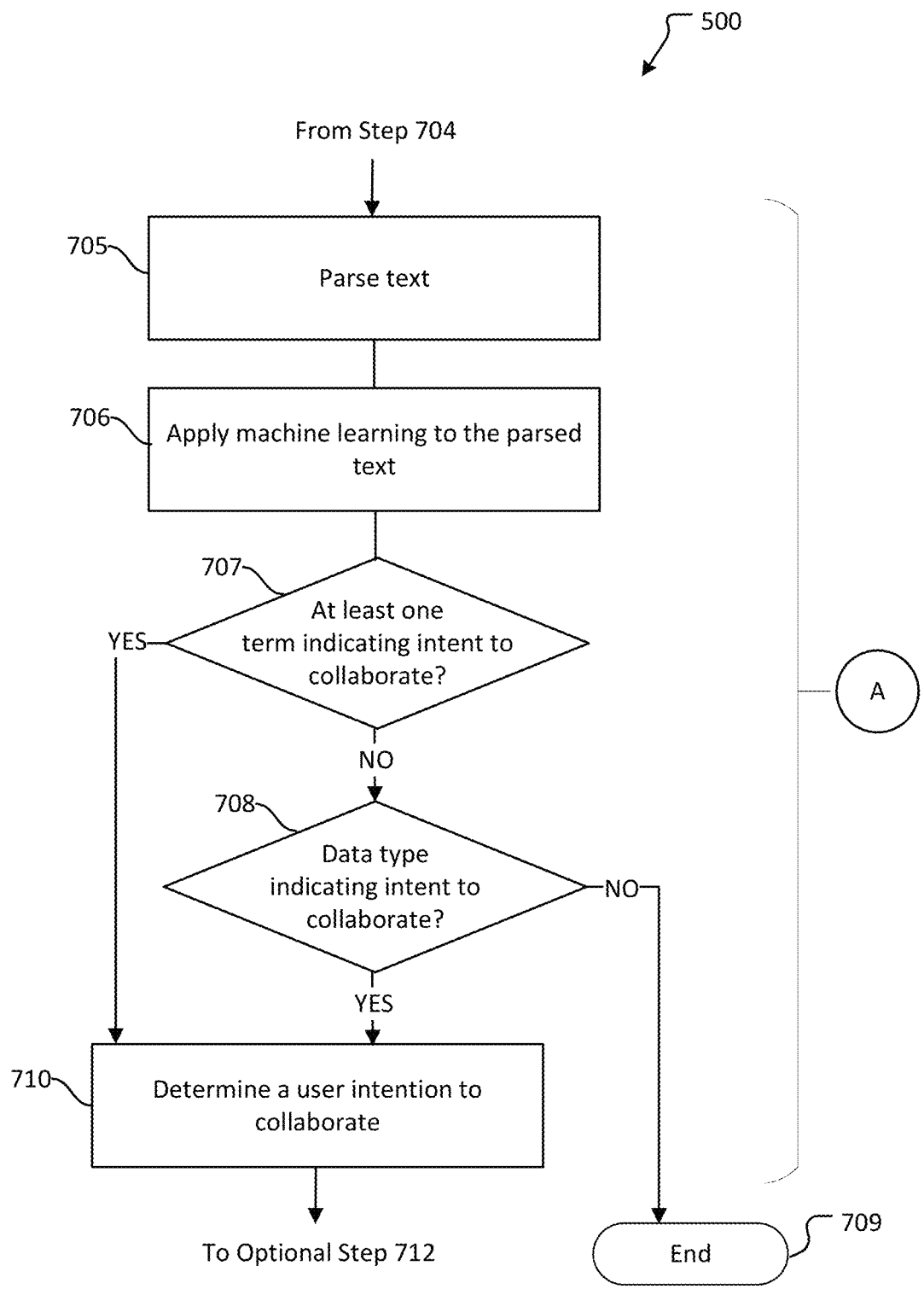
Figure 7C:
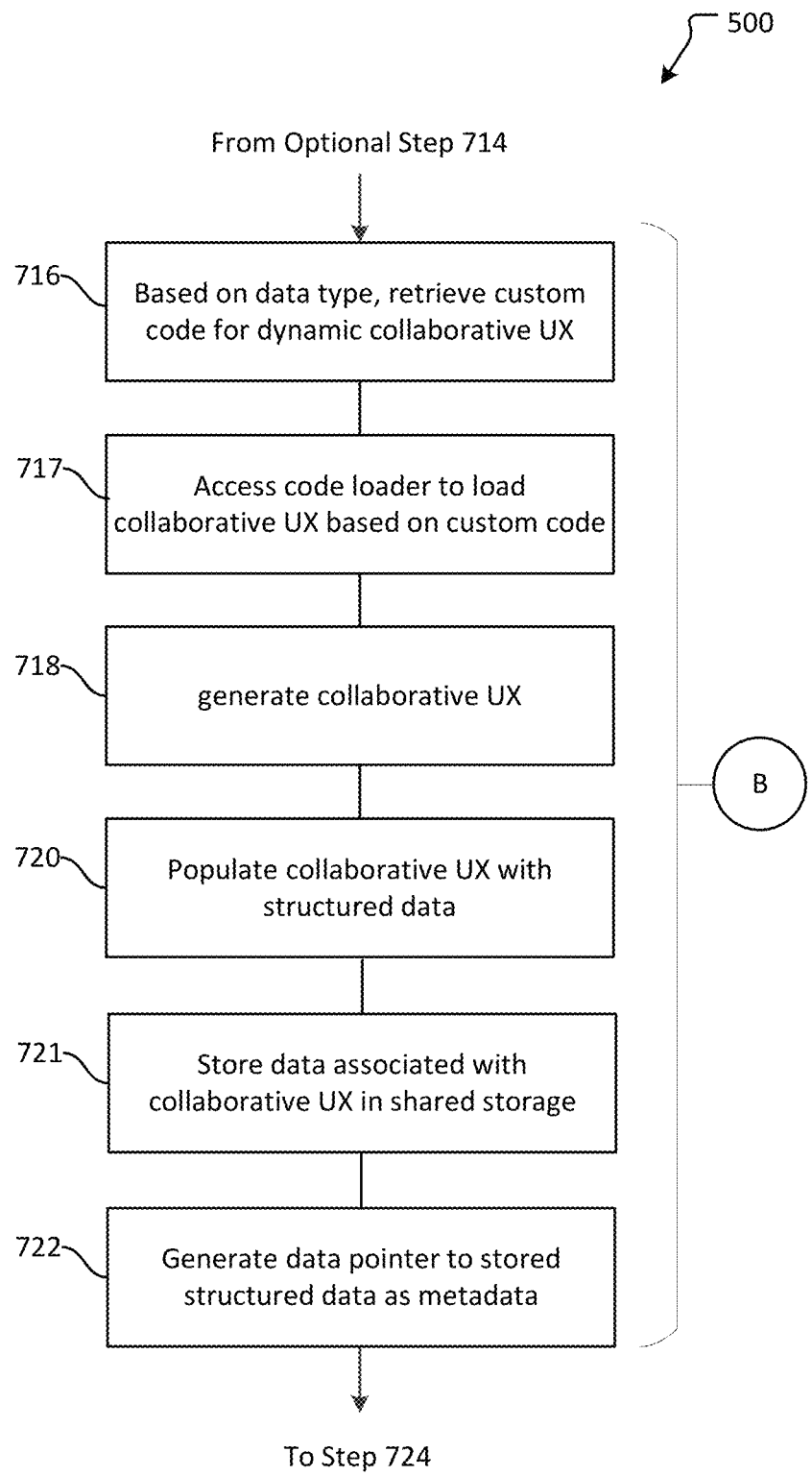

FIGS. 7A-C illustrate a first example method for converting structured data into a collaborative user experience (UX), in accordance with aspects of the present disclosure. FIG. 7A illustrates a general method for converting structured data into a collaborative user experience (UX), in accordance with aspects of the present disclosure.

A general order of the operations for the method 700 is shown in FIGS. 7A-C. The method 700 may include more or fewer steps and/or may progress in a different order of steps from those shown in FIGS. 7A-C. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, user interfaces, modules, software, data structures, data characteristic representations, signaling diagrams, methods, etc., described in conjunction with FIGS. 1-6B and 8A-12B.

At receive operation 702, structured data and text input may be received into a compose message of a messaging application. A compose message is a message that is being composed by a user prior to sending the message (e.g., an email message, chat message, text message, social thread, or the like). The structured data may comprise any type of formatted data, such as a bulleted list, a numbered list, a table, a chart, and the like.

At type operation 704, the messaging application may determine a data type associated with the structured data. For instance, data types for the structured data may comprise a description of the formatting for the structured data, such as bulleted list data type, numbered list data type, numbered question data type, table data type, and the like. Based on the data type, it may be further determined whether a corresponding collaborative UX is available for the data type. In an example, a corresponding collaborative UX may refer to a collaborative UX that has been customized for the data type. A collaborative UX customized for the data type may comprise an interactive data structure corresponding to the structured data type. That is, for a bulleted list data type, the interactive data structure may comprise a dynamic container for storing and updating data associated with a bulleted list; whereas for a table data type, the interactive data structure may comprise a dynamic container for storing and updating data associated with a table. In aspects, a collaborative UX customized for the data type may be associated with pre-configured metadata, including a pointer to custom code for building the collaborative UX and the associated interactive data structure, and a pointer to a code loader for ingesting the custom code and rendering the collaborative UX and the interactive data structure.

At determine intent operation 710, the messaging application may evaluate the structured data (or the structured data type) and the text input to determine if the user (sender) has an intent to collaborate. For instance, machine learning may be applied to the text input and/or the structured data type to determine the intent to collaborate. For instance, the machine learning algorithm(s) may be trained to identify indications of an intent to collaborate within the text input, such as @mentions of other users (e.g., user 218A or user 218B), terms associated with collaboration (e.g., "decide," "choose," "vote," "confer," "brainstorm," "collaborate," etc.), voting buttons, and the like. In some cases, the structured data type may itself be an indication of an intent to collaborate (e.g., a numbered question data type). Based on the identified indications of an intent to collaborate, the machine learning algorithm(s) may further determine a likelihood that the user (sender) has an intent to collaborate. That is, based on the number or type of intent indications, the machine learning algorithm may determine whether it is more or less likely that the sender has an intent to collaborate. For instance, for a compose message including more intent indications, it may be determined that the sender is more likely to have an intent to collaborate. Additionally, a compose message including stronger intent indications (e.g., @mentions) may be determined to be more likely to have an intent to collaborate.

At optional prompt operation 712, when it is determined that the user (sender) is likely to have an intent to collaborate, a prompt may optionally be provided indicating that a collaborative UX is available for the link. For instance, the prompt may be in the form of a question (e.g., "Make this link collaborative?"); in other aspects, the prompt may be in the form of an informative feature notification (e.g., "Collaborating? Try a new live component! Collaborate on this link in real-time and share seamlessly across apps. Learn More"). The prompt may further include a selectable element, such as check box, an accept button, a slide button, and the like, for approving or initiating conversion of the structured data into the collaborative UX. In other aspects, if a collaborative UX is identified for the data type of the structured data, the structured data may automatically be converted into a collaborative UX.

At optional select operation 714, when a selectable element is provided with the prompt, a user may select the selectable element to accept or initiate conversion of the structured data into a collaborative UX.

At generate UX operation 718, the collaborative UX may be generated. For instance, based on the preconfigured metadata for the corresponding collaborative UX, the code pointer to custom code may be followed and the code loader may be called to ingest the custom code to generate the collaborative UX. Additionally, a data pointer to a storage location may be created to store data associated with the collaborative UX (e.g., for synchronizing any updates to the collaborative UX, such as edits to or comments regarding the structured data). In aspects, the data pointer may be added to the preconfigured metadata and associated with the structured data; in other aspects, the data pointer and the preconfigured metadata may be independently associated with the structured data.

At populate operation 720, the collaborative UX may be populated with the structured data received as input into the compose message. As noted above, the collaborative UX customized for the data type may comprise an interactive data structure corresponding to the data type. An interactive data structure may comprise a dynamic container customized to store data associated with the data type. That is, for a bulleted list data type, the interactive data structure may comprise a dynamic container for storing and updating data associated with a bulleted list; whereas for a table data type, the interactive data structure may comprise a dynamic container for storing and updating data associated with a table. Initially, the interactive data structure may be populated by the structured data received from the sender in the compose message.

At render operation 724, the collaborative UX with the structured data may be rendered in the compose message. In aspects, the collaborative UX may be rendered in place of the structured data. Moreover, the collaborative UX may be rendered in-line (e.g., above, below, or between) with the text input within the compose message.

At send operation 726, the compose message, including the text input and the structured data associated with the metadata for the collaborative UX, may be sent by the sender to one or more recipients.

In aspects, determine intent operation 710 is detailed further with respect to FIG. 7B (as indicated by "A"), and generate UX operation 718 and populate operation 720 are detailed further with respect to FIG. 7C (as indicated by "B").

FIG. 7B illustrates a sequence of operations for determine intent operation 710 of method 700 associated with FIG. 7A, in accordance with aspects of the present disclosure.

At parse operation 705, the text input may be parsed to detect and classify one or more terms or phrases.

At apply operation 706, machine learning may be applied to the terms or phrases to identify indications of an intent to collaborate within the text input, such as @mentions of other users (e.g., user 218A or user 218B), terms associated with collaboration (e.g., "decide," "choose," "vote," "confer," "brainstorm," "collaborate," etc.), voting buttons, and the like.

At term determination operation 707, it may be determined whether at least one term or phrase indicating an intent to collaborate has been identified within the parsed text based on the machine learning. If at least one term or phrase indicating an intent to collaborate has been identified, the method may progress to intent determination operation 710. If at least one term or phrase indicating an intent to collaborate has not been identified, the method may progress to type determination operation 708.

At type determination operation 708, it may be determined whether the data type of the structured data indicates an intention to collaborate. For instance, even without a term or phrase indicating an intent to collaborate, the data type itself may be an indication of intent to collaborate. For instance, a numbered question data type may comprise a plurality of numbered questions. Traditionally, when a sender creates and sends such a list of questions to a recipient, the recipient often replies to the message and inserts answers to each question in-line (perhaps in a different font color. Accordingly, when the sender creates such a number list of questions for one or more recipients, this may be identified as an indication to collaborate with the one or more recipients with regard to the questions. If it is determined that the data type indicates an intent to collaborate, the method may progress to intent determination operation 710. If the data type does not indicate an intent to collaborate, the method may progress to end operation 709.

At end operation 709, the messaging application may determine that the structured data and text input in the compose message do not indicate an intent to collaborate. In this case, the sender may send the compose message with the structured data and the text input in the traditional way.

Again, at determine intent operation 710, based on the identified indications of an intent to collaborate, the machine learning algorithm(s) may further determine a likelihood that the user (sender) has an intent to collaborate. That is, based on the number or type of intent indications, the machine learning algorithm may determine whether it is more or less likely that the sender has an intent to collaborate. For instance, for a compose message including more intent indications, it may be determined that the sender is more likely to have an intent to collaborate. Additionally, a compose message including stronger intent indications (e.g., @mentions) may be determined to be more likely to have an intent to collaborate.

FIG. 7C illustrates a sequence of operations for generate UX operation 718 and populate operation 720 of method 700 associated with FIG. 7A, in accordance with aspects of the present disclosure.

At retrieve operation 716, based on the collaborative UX determined for the data type, custom code for the collaborative UX may be retrieved. For instance, a code pointer within metadata associated with the collaborative UX may be followed to retrieve the custom code.

At access operation 717, further based on the metadata associated with the collaborative UX, a load pointer may be followed to access (or call) a code loader for ingesting the custom code and loading the collaborative UX.

Again, at generate UX operation 718, the code loader may ingest the custom code to generate the collaborative UX.

Again, at populate operation 720, the collaborative UX may be populated with the structured data received as input into the compose message. As noted above, the collaborative UX customized for the data type may comprise an interactive data structure corresponding to the data type. In aspects, the interactive data structure may be populated with the structured data received from the sender in the compose message. Upon populating the interactive data structure with the initial structured data input by the sender, the collaborative UX comprises the initial structured data such that the user does not need to re-input any information into the compose message when the structured data is converted to the collaborative UX.

At store operation 721, data associated with the collaborative UX may be stored in shared storage. In general, data associated with a collaborative UX may include any user collaborations, including instant messages between users regarding the structured data, changes to the structured data, and the like. At least initially, the structured data input by the sender is stored in shared storage.

At generate pointer operation 722, a data pointer to the storage location of the data associated with the collaborative UX in the shared storage may be created. In aspects, the data pointer may be added to the preconfigured metadata and associated with the structured data; in other aspects, the data pointer and the preconfigured metadata may be independently associated with the structured data.

As should be appreciated, operations 702-726 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 8A:
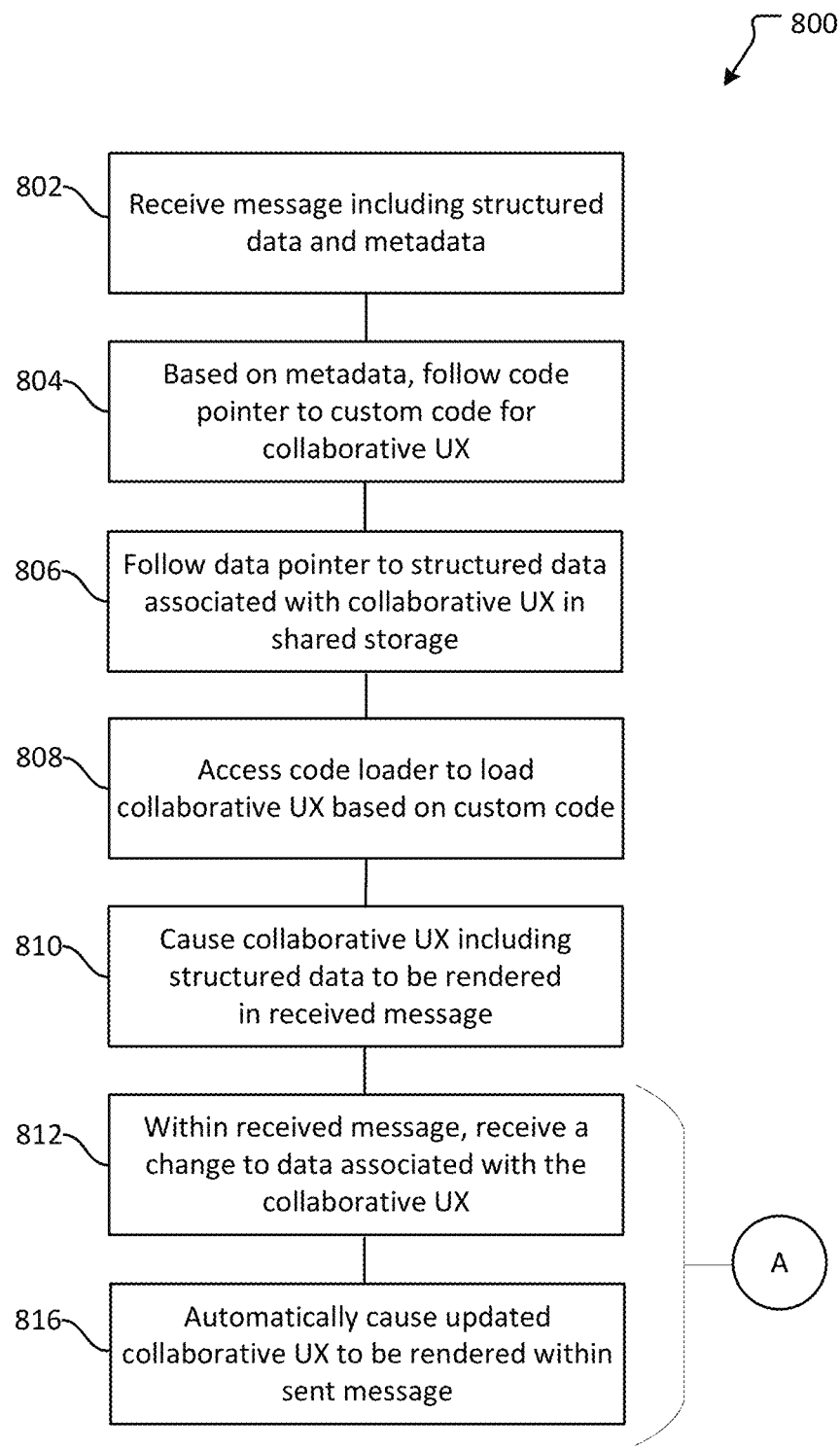
FIGS. 8A-B illustrate a first example method for receiving a message including structured data and metadata, in accordance with aspects of the present disclosure.
Figure 8B:
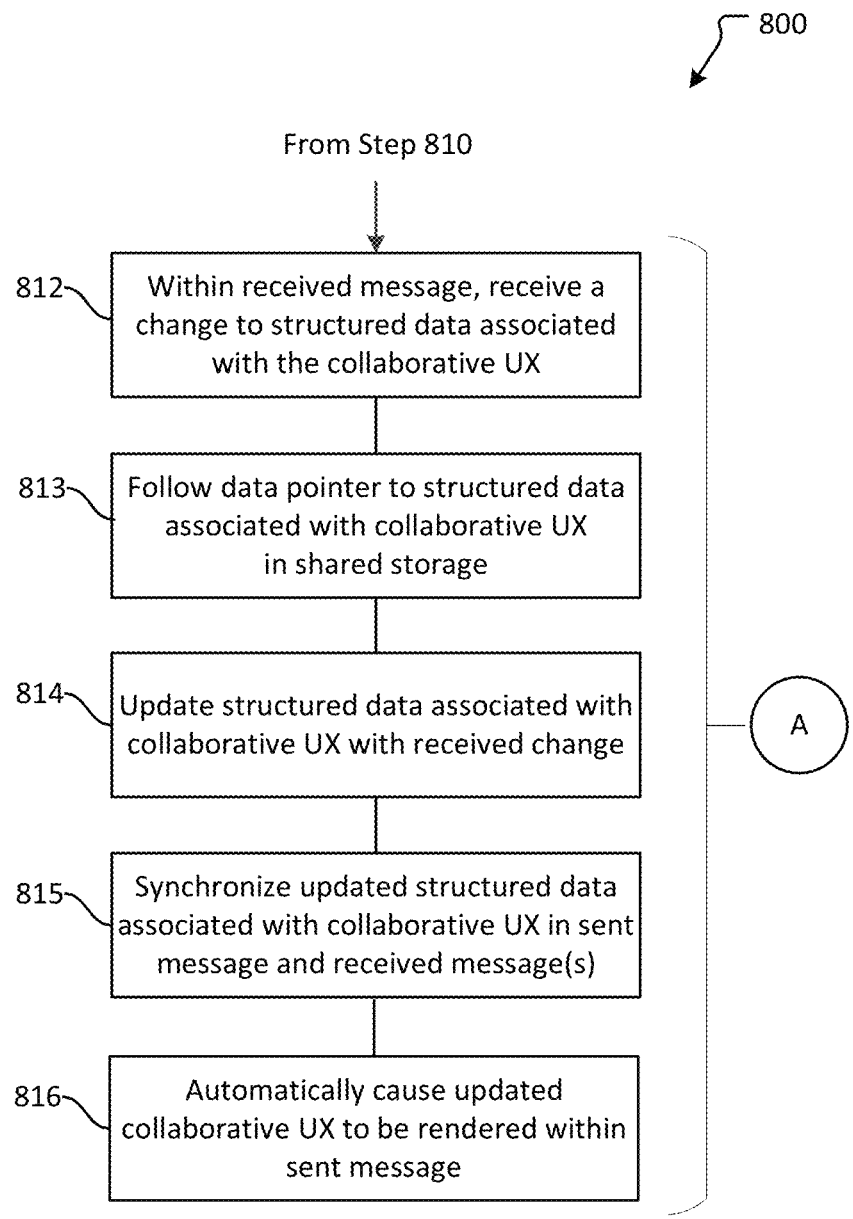

FIGS. 8A-B illustrate a first example method for receiving a message including structured data and metadata, in accordance with aspects of the present disclosure. FIG. 8A illustrates a general method for receiving the message including structured data and metadata, in accordance with aspects of the present disclosure.

A general order of the operations for the method 800 is shown in FIGS. 8A-B. The method 800 may include more or fewer steps and/or may progress in a different order of steps from those shown in FIGS. 8A-B. The method 800 can be executed as a set of computer-executable instructions executed by a computer system and encoded or stored on a computer readable medium. Further, the method 800 can be performed by gates or circuits associated with a processor, an ASIC, an FPGA, a SOC or other hardware device. Hereinafter, the method 800 shall be explained with reference to the systems, components, devices, user interfaces, modules, software, data structures, data characteristic representations, signaling diagrams, methods, etc., described in conjunction with FIGS. 1-7C and 9-12B.

At receive message operation 802, a message may be received by a messaging application of a recipient user. In aspects, the message may include structured data and associated metadata.

At follow operation 804, based on the metadata, the messaging application of the recipient may follow a code pointer to retrieve custom code for a collaborative UX and interactive data structure associated with the structured data.

At follow operation 806, a data pointer may be followed to retrieve data associated with the interactive data structure of the collaborative UX. Data associated with the interactive data structure may include any user collaborations (including instant messages between users regarding the structured data), edits to the structured data, and the like.

At access operation 808, based on the metadata, the messaging application of the recipient may follow a load pointer to access a code loader for ingesting the custom code and loading the collaborative UX.

At render operation 810, the messaging application may render the collaborative UX including the structured data in the received message. In aspects, the collaborative UX may be rendered in-line (e.g., above, below, or between) with the text input within the received message. Furthermore, since the structured data is provided within the collaborative UX (e.g., within a content frame), the recipient is able to view and interact with the structured data within the received message rather than exchanging additional messages to collaborate on or make changes to the structured data.

At change operation 812, the messaging application may receive a change to the data associated with the collaborative UX in the received message. In an example, a change may include edits, additions, or deletions of data. For example, the recipient may edit the structured data or send an instant message to the sender and/or another recipient regarding the structured data. Again, since the structured data is provided within the collaborative UX, the recipient is able to make the change within the received message rather than exchanging additional messages to collaborate on or make changes to the structured data.

At automatic operation 816, the received change within the collaborative UX may be automatically synchronized with the data in storage associated with the collaborative UX, e.g., by again following the data pointer. When the data is synchronized with the change in storage, the change may also be pushed to any related collaborative UXs, e.g., within the sent message and any other received messages. In this way, an updated collaborative UX may automatically be rendered within the sent message in near real-time. In this way, additional message exchanges between the recipient and the sender (and any other recipients) are not necessary to promulgate the change.

In aspects, change operation 812 and automatic operation 816 are detailed further with respect to FIG. 8B (as indicated by "A").

FIG. 8B illustrates a sequence of operations for operation 812 and automatic operation 816 of method 800 associated with FIG. 8A, in accordance with aspects of the present disclosure.

Again, at change operation 812, the messaging application may receive a change to the data associated with the collaborative UX in the received message. In an example, a change may include edits, additions, or deletions of data. For example, the recipient may edit the structured data or send an instant message to the sender and/or another recipient regarding the structured data. Again, since the structured data is provided within the collaborative UX, the recipient is able to make the change within the received message rather than exchanging additional messages to collaborate on or make changes to the structured data.

At follow pointer operation 813, the messaging application may follow the data pointer to the data associated with the collaborative UX in storage. As noted above, the data associated with the collaborative UX may include any user collaborations (e.g., instant messages between users regarding the structured data) and changes to the structured data within the interactive data structure (e.g., additions, deletions, edits, responses to questions, etc.), for example.

At update operation 814, the data associated with the collaborative UX may be updated in storage based on the change received from the recipient. In aspects, the update operation 814 may occur when the change is received such that the data in storage may be updated in near real-time.

At synchronize operation 815, the updated data associated with the collaborative UX in storage may be synchronized (or pushed out) to any related collaborative UXs, e.g., within the sent message and any other received messages. In aspects, the synchronize operation 815 may occur when the update to the data in storage is received such that the related collaborative UXs are updated in near real-time.

Again, at automatic operation 816, the received change within the collaborative UX may synchronized such that an updated collaborative UX is automatically rendered within the sent message (and any other received messages) in near real-time. In this case, additional message exchanges between the recipient and the sender (and any other recipients) are not necessary to promulgate the change.

As should be appreciated, operations 802-816 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 9:
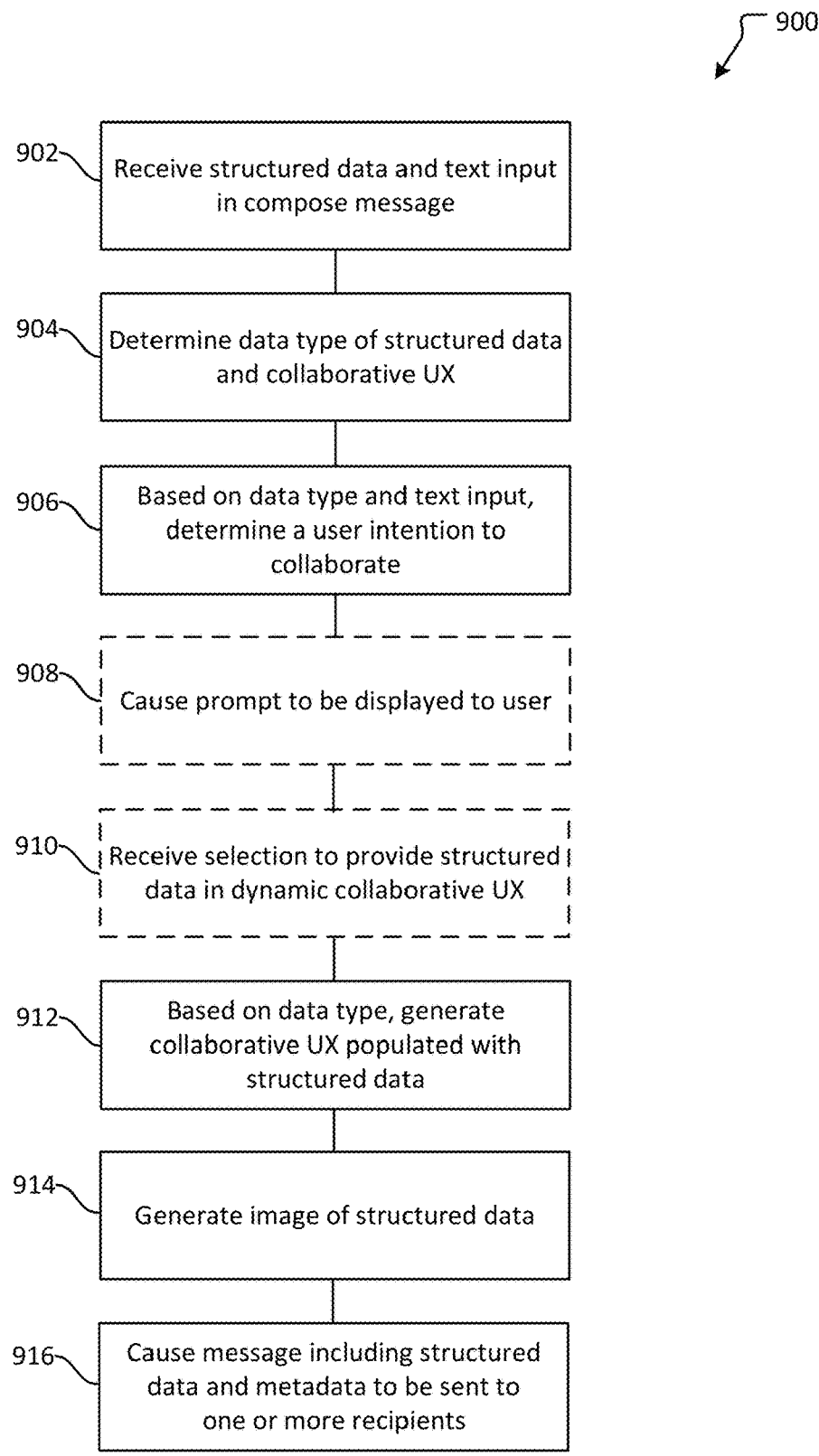
FIG. 9 illustrates a second example method for converting structured data into a collaborative user experience (UX), in accordance with aspects of the present disclosure.

FIG. 9 illustrates a second example method for converting structured data into a collaborative user experience (UX), in accordance with aspects of the present disclosure.

A general order of the operations for the method 900 is shown in FIG. 9. The method 900 may include more or fewer steps and/or may progress in a different order of steps from those shown in FIG. 9. The method 900 can be executed as a set of computer-executable instructions executed by a computer system and encoded or stored on a computer readable medium. Further, the method 900 can be performed by gates or circuits associated with a processor, an ASIC, an FPGA, a SOC or other hardware device. Hereinafter, the method 900 shall be explained with reference to the systems, components, devices, user interfaces, modules, software, data structures, data characteristic representations, signaling diagrams, methods, etc., described in conjunction with FIGS. 1-8B and 10-12B.

At receive operation 902, structured data and text input may be received into a compose message of a messaging application. A compose message is a message that is being composed by a user prior to sending the message (e.g., an email message, chat message, text message, social thread, or the like). The structured data may comprise any type of formatted data, such as a bulleted list, a numbered list, a table, a chart, and the like.

At type operation 904, the messaging application may determine a data type associated with the structured data. For instance, data types for the structured data may comprise a description of the formatting for the structured data, such as bulleted list data type, numbered list data type, numbered question data type, table data type, and the like. Based on the data type, it may be further determined whether a corresponding collaborative UX is available for the data type. In an example, a corresponding collaborative UX may refer to a collaborative UX that has been customized for the data type. A collaborative UX customized for the data type may comprise an interactive data structure corresponding to the structured data type. That is, for a bulleted list data type, the interactive data structure may comprise a dynamic container for storing and updating data associated with a bulleted list; whereas for a table data type, the interactive data structure may comprise a dynamic container for storing and updating data associated with a table. In aspects, a collaborative UX customized for the data type may be associated with preconfigured metadata, including a pointer to custom code for building the collaborative UX and the associated interactive data structure, and a pointer to a code loader for ingesting the custom code and rendering the collaborative UX and the interactive data structure.

At determine intent operation 906, the messaging application may evaluate the structured data (or the structured data type) and the text input to determine if the user (sender) has an intent to collaborate. For instance, machine learning may be applied to the text input and/or the structured data type to determine the intent to collaborate. For instance, the machine learning algorithm(s) may be trained to identify indications of an intent to collaborate within the text input, such as @mentions of other users (e.g., user 218A or user 218B), terms associated with collaboration (e.g., "decide," "choose," "vote," "confer," "brainstorm," "collaborate," etc.), voting buttons, and the like. In some cases, the structured data type may itself be an indication of an intent to collaborate (e.g., a numbered question data type). Based on the identified indications of an intent to collaborate, the machine learning algorithm(s) may further determine a likelihood that the user (sender) has an intent to collaborate. That is, based on the number or type of intent indications, the machine learning algorithm may determine whether it is more or less likely that the sender has an intent to collaborate. For instance, for a compose message including more intent indications, it may be determined that the sender is more likely to have an intent to collaborate. Additionally, a compose message including stronger intent indications (e.g., @mentions) may be determined to be more likely to have an intent to collaborate.

At optional prompt operation 908, when it is determined that the user (sender) is likely to have an intent to collaborate, a prompt may optionally be provided indicating that a collaborative UX is available for the link. For instance, the prompt may be in the form of a question (e.g., "Make this link collaborative?"); in other aspects, the prompt may be in the form of an informative feature notification (e.g., "Collaborating? Try a new live component! Collaborate on this link in real-time and share seamlessly across apps. Learn More"). The prompt may further include a selectable element, such as check box, an accept button, a slide button, and the like, for approving or initiating conversion of the structured data into the collaborative UX. In other aspects, if a collaborative UX is identified for the data type of the structured data, the structured data may automatically be converted into a collaborative UX.

At optional select operation 910, when a selectable element is provided with the prompt, a user may select the selectable element to accept or initiate conversion of the structured data into a collaborative UX.

At generate UX operation 912, the collaborative UX may be generated. For instance, based on the preconfigured metadata for the corresponding collaborative UX, the code pointer to custom code may be followed and the code loader may be called to ingest the custom code to generate the collaborative UX. The collaborative UX may also be populated with the structured data received as input into the compose message. As noted above, the collaborative UX customized for the data type may comprise an interactive data structure corresponding to the data type. Initially, the interactive data structure may be populated by the structured data received from the sender in the compose message. Additionally, a data pointer to a storage location may be created to store data associated with the collaborative UX (e.g., for synchronizing any updates to the collaborative UX, such as edits to or comments regarding the structured data). In aspects, the data pointer may be added to the preconfigured metadata and associated with the structured data; in other aspects, the data pointer and the preconfigured metadata may be independently associated with the structured data.

At image operation 914, an image of the structured data may be generated. For instance, a static representation of the structured data may be generated. In this way, if a recipient's messaging application may be a legacy version of the messaging application used by the sender (e.g., a local version of Microsoft Outlook versus Outlook Web Access) or the recipient's messaging application may be a different type of messaging application from the messaging application used by the sender (e.g., Microsoft Outlook versus Gmail), for example. In this case, instructions for rendering the image of the structured data may be added to the metadata.

At send operation 916, the compose message, including the text input and the structured data associated with the metadata for the collaborative UX, may be sent by the sender to one or more recipients.

As should be appreciated, operations 902-916 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 10:
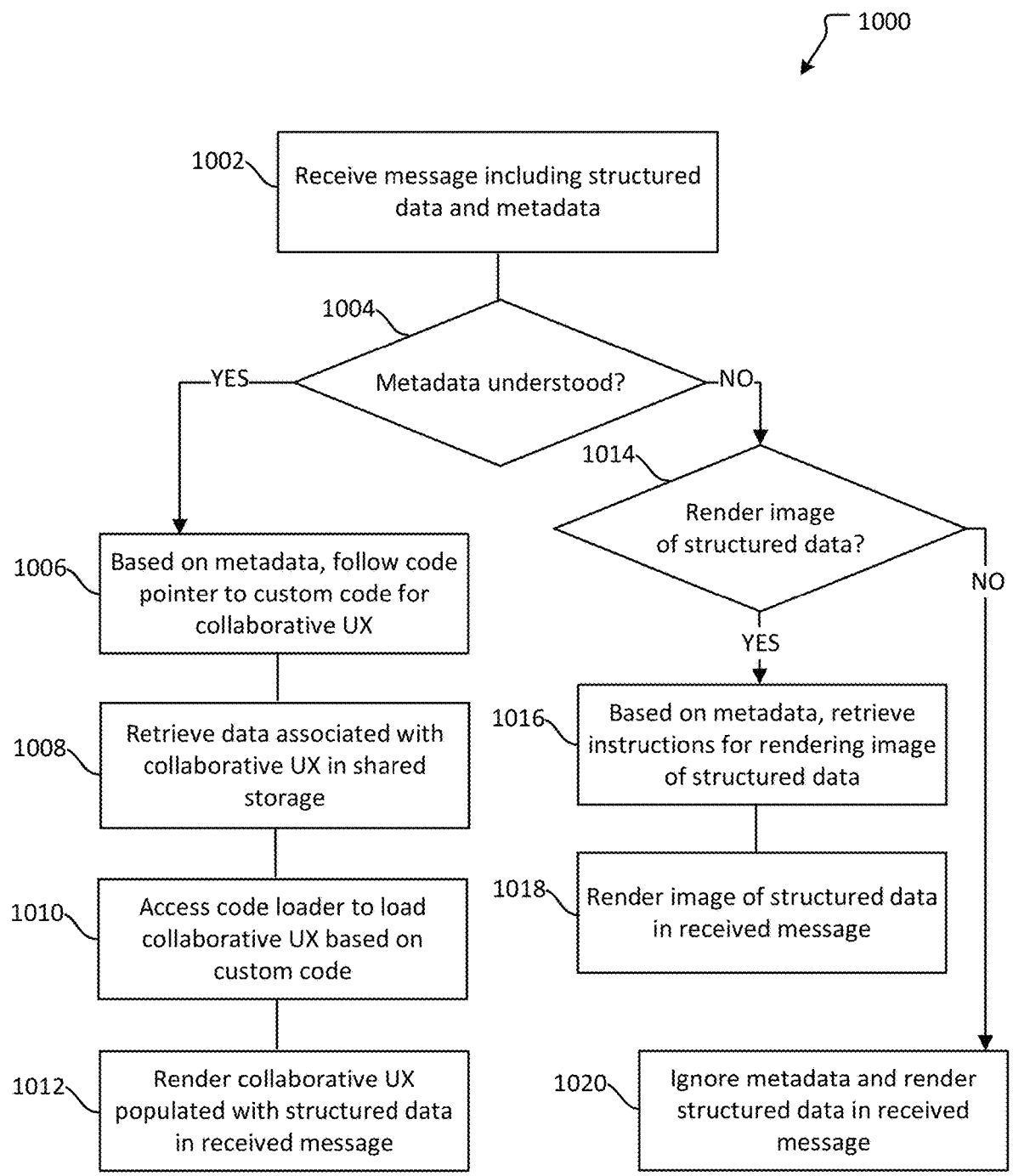
FIG. 10 illustrates an example method for receiving a message including structured data and metadata, in accordance with aspects of the present disclosure.

FIG. 10 illustrates an example method for receiving a message including structured data and metadata, in accordance with aspects of the present disclosure.

A general order of the operations for the method 1000 is shown in FIG. 10. The method 1000 may include more or fewer steps and/or may progress in a different order of steps from those shown in FIG. 10. The method 1000 can be executed as a set of computer-executable instructions executed by a computer system and encoded or stored on a computer readable medium. Further, the method 1000 can be performed by gates or circuits associated with a processor, an ASIC, an FPGA, a SOC or other hardware device. Hereinafter, the method 1000 shall be explained with reference to the systems, components, devices, user interfaces, modules, software, data structures, data characteristic representations, signaling diagrams, methods, etc., described in conjunction with FIGS. 1-9 and 11-12B.

At receive message operation 1002, a message may be received by a messaging application of a recipient user. In aspects, the message may include structured data and associated metadata.

At determination operation 1004, it may be determined if the receiving messaging application is able to understand the metadata. For example, the receiving messaging application may not be able to "understand" the metadata when the messaging application cannot follow the code pointer to the custom code and/or the load pointer to the code loader, when the messaging application cannot follow the data pointer or does not have permissions to access to the data in storage, when the messaging application cannot read the metadata based on its format or syntax, etc. In this case, the receiving messaging application may be a legacy version of the messaging application used by the sender (e.g., a local version of Microsoft Outlook versus Outlook Web Access) or the receiving messaging application may be a different type of messaging application from the messaging application used by the sender (e.g., Microsoft Outlook versus Gmail), for example. If the receiving messaging application is able to understand the metadata, the method may progress to follow operation 1006. If the receiving messaging application is not able to understand the metadata, the method may progress to image determination operation 1014.

At follow operation 1006, based on the metadata, the messaging application of the recipient may follow a code pointer to retrieve custom code for a collaborative UX and interactive data structure associated with the structured data.

At retrieve operation 1008, based on the metadata, a data pointer may be followed to retrieve data associated with the interactive data structure of the collaborative UX. Data associated with the interactive data structure may include any user collaborations (including instant messages between users regarding the structured data), edits to the structured data, and the like.

At access operation 1010, based on the metadata, the messaging application of the recipient may follow a load pointer to access a code loader for ingesting the custom code and loading the collaborative UX.

At render operation 1012, the messaging application may render the collaborative UX including the structured data in the received message. In aspects, the collaborative UX may be rendered in-line (e.g., above, below, or between) with the text input within the received message. In aspects, since the structured data is provided within the collaborative UX (e.g., within a content frame), the recipient is able to view and interact with the structured data within the received message rather than exchanging additional messages to collaborate on or make changes to the structured data.

At image determination operation 1014, it may be determined whether to render an image of the structured data within the received message. If the messaging application should render an image of the structured data, the method may progress to retrieve operation 1016. If the messaging application should not render an image of the structured data, the method may progress to render data operation 1020.

At retrieve information operation 1016, instructions for rendering the image of the structured data may be retrieved. In aspects, the instructions may be appended to the received message, for example.

At render image operation 1018, based on the instructions, the messaging application may render the image of the structured data in the received message.

At render data operation 1020, the messaging application may ignore the metadata associated with the structured data and may render the structured data in a static form within the received message.

As should be appreciated, operations 902-916 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 11:
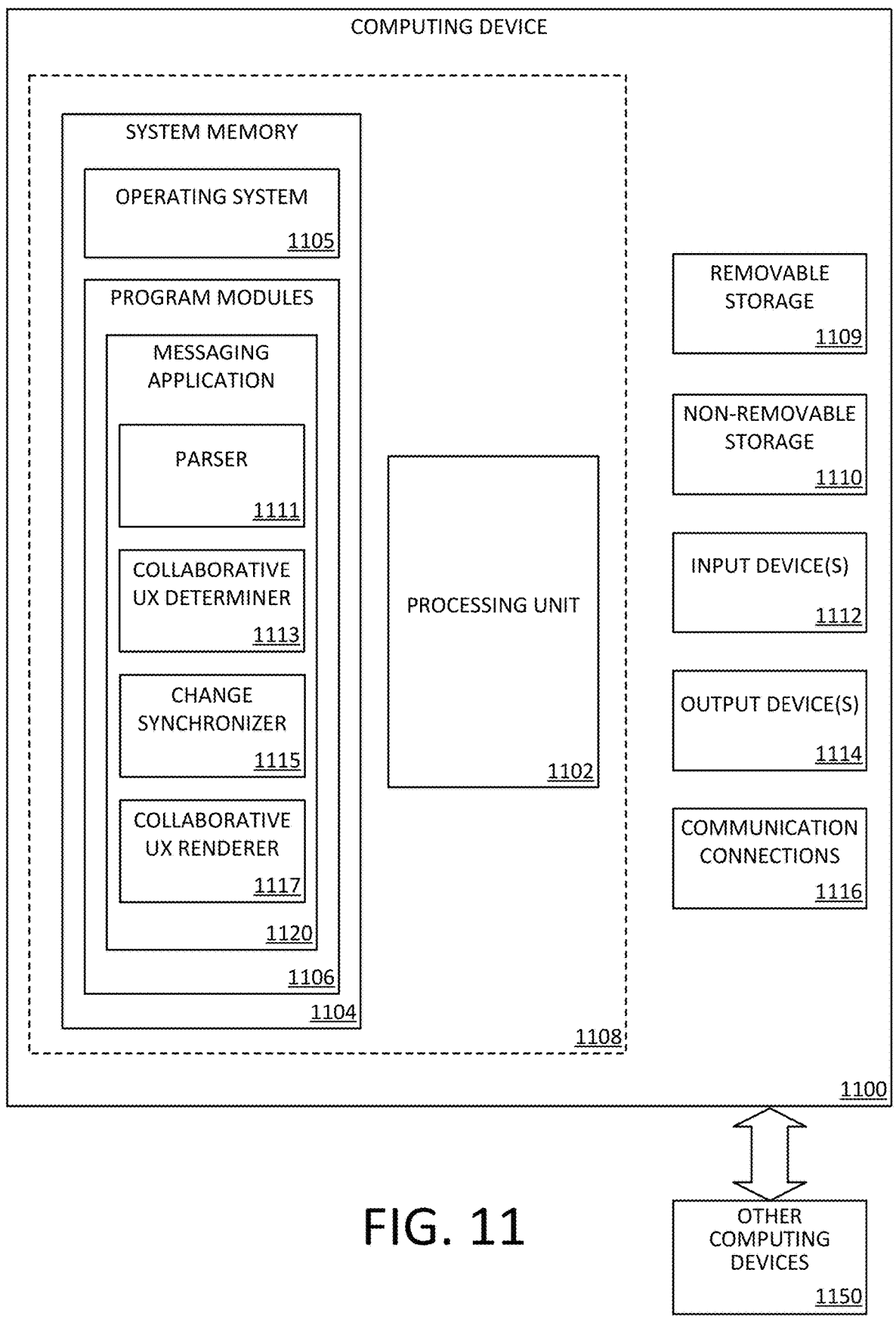
FIG. 11 is a block diagram illustrating physical components (e.g., hardware) of a computing device with which aspects of the disclosure may be practiced.
Figure 12A:
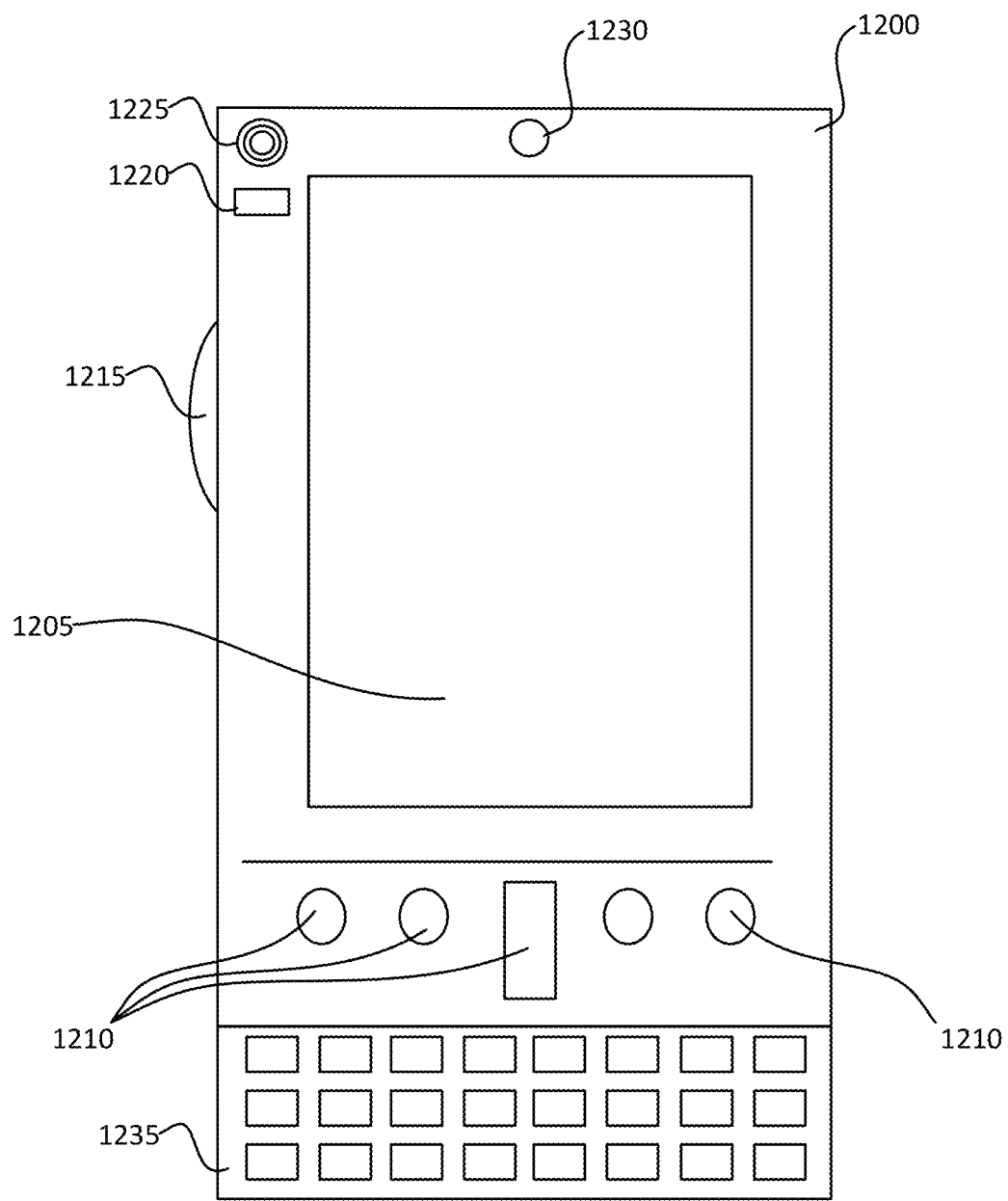
FIGS. 12A-B illustrate a mobile computing device with which embodiments of the disclosure may be practiced.
Figure 12B:
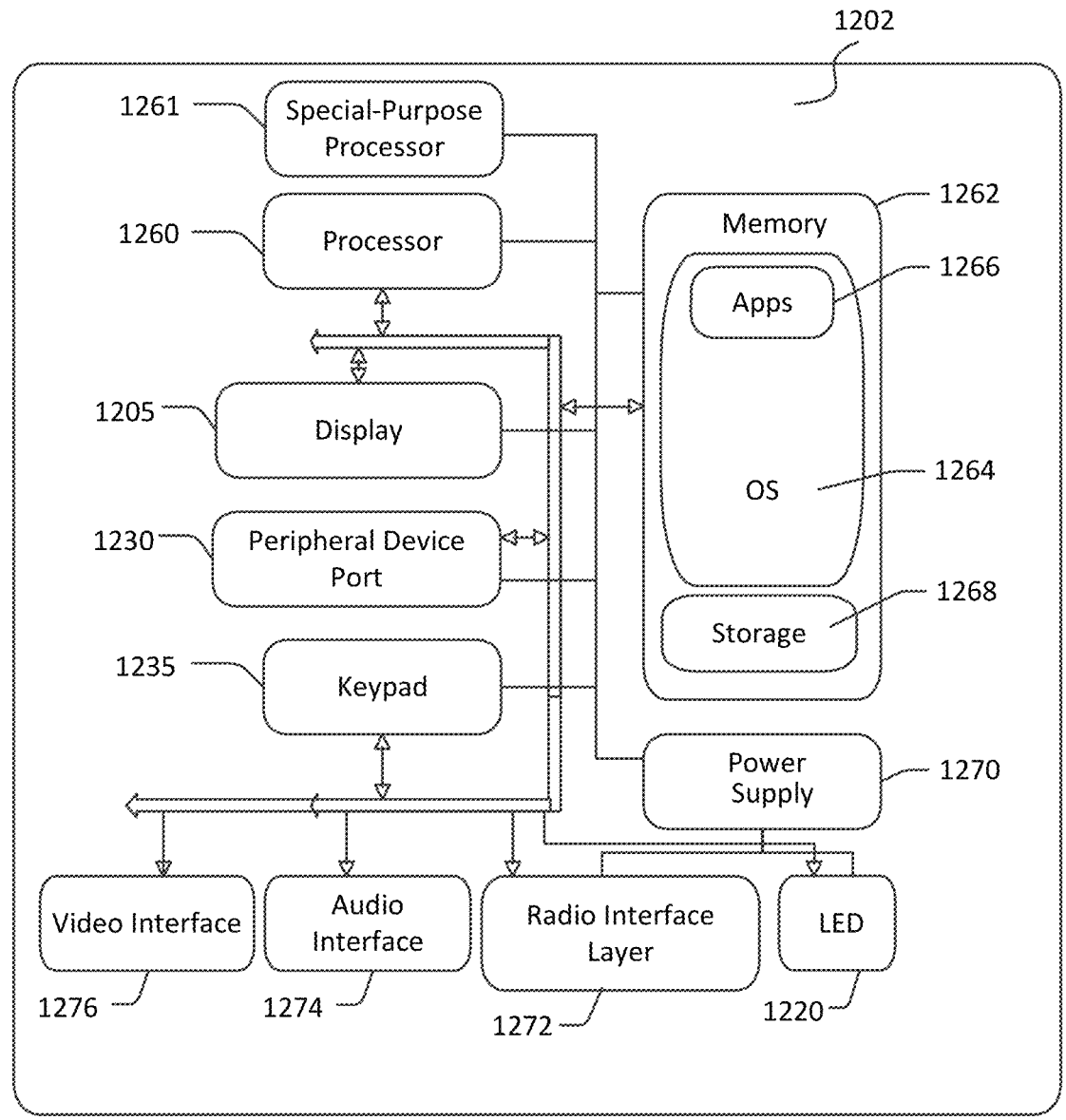

FIGS. 11-12B and the associated descriptions provide a discussion of a variety of operating environments in which aspects of the disclosure may be practiced. However, the devices and systems illustrated and discussed with respect to FIGS. 11-12B are for purposes of example and illustration and are not limiting of a vast number of computing device configurations that may be utilized for practicing aspects of the disclosure, described herein FIG. 11 is a block diagram illustrating physical components (e.g., hardware) of a computing device 1100 with which aspects of the disclosure may be practiced. The computing device components described below may have computer executable instructions for implementing a messaging application 1120 on a computing device, including computer executable instructions for messaging application 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running messaging application 1120, such as one or more components in regards to FIG. 1 and, in particular, parser 1111, collaborative UX determiner 1113, change synchronizer 1115, or collaborative UX renderer 1117. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., messaging application 1120) may perform processes including, but not limited to, the aspects, as described herein. Other program modules that may be used in accordance with aspects of the present disclosure, and in particular for providing a messaging application interface, may include parser 1111, collaborative UX determiner 1113, change synchronizer 1115, or collaborative UX renderer 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a messaging application interface as described herein (e.g., parser, collaborative UX determiner, change synchronizer, collaborative UX renderer, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer-executable instructions that, when executed by the at least one processor, cause the at least one processor to:
   determine a content type associated with a link received into a message being composed by a user;
   based on the content type, identify a collaborative user experience (UX) customized for the content type, the collaborative UX being an interface configured to enable interaction between the user and at least one recipient, the collaborative UX including one or more collaborative features customized for the content type;
   retrieve metadata associated with the identified collaborative UX;
   based on the metadata, cause a first collaborative UX to be rendered in the message, wherein the first collaborative UX includes content retrieved based on the link;
   receive an indication to send the message to the at least one recipient; and
   within a sent message corresponding to the message, cause the first collaborative UX to be automatically updated based on a change received to a second collaborative UX in a received message corresponding to the message.

2. The system of claim 1, wherein the computer-executable instructions when executed by the at least one processor, further cause the at least one processor to:
   in response to identifying the collaborative UX, cause display of a selectable prompt indicating that the identified collaborative UX is available for dynamic collaboration regarding the content retrieved based on the link.

3. The system of claim 2, wherein the computer-executable instructions when executed by the at least one processor, further cause the at least one processor to:
   receive selection of the selectable prompt; and
   in response to the selection, cause the first collaborative UX to be rendered in the message.

4. The system of claim 1, wherein the content associated with the link is a streaming video, and wherein the link is directed to the streaming video on a website.

5. The system of claim 1, wherein the content associated with the link is a file, and wherein the link is directed to the file in a storage location.

6. The system of claim 1, wherein the first collaborative UX is updated at substantially a same time as the change was received in the second collaborative UX.

7. The system of claim 1, wherein the metadata comprises a code pointer to custom code associated with the identified collaborative UX.

8. The system of claim 7, wherein the metadata comprises a load pointer to a code loader, and wherein the code loader is called to render the first collaborative UX.

9. The system of claim 1, wherein the change is not received in a reply to the message from the at least one recipient.

10. The system of claim 1, wherein the computer-executable instructions when executed by the at least one processor, further cause the at least one processor to:
    cause the first collaborative UX to be rendered in-line with text in the message.

11. A computer storage medium storing computer-executable instructions that when executed cause at least one processor to:
    receive a link into a message that is being composed by a user;
    determine a content type associated with the link;
    based on the content type, identify a collaborative user experience (UX) customized for the content type, the collaborative UX being an interface configured to enable interaction between the user and at least one recipient, the collaborative UX including one or more collaborative features customized for the content type;
    based on the identified collaborative UX, cause a first collaborative UX to be rendered in the message, wherein the first collaborative UX includes content retrieved based on the link;
    receive an indication to send the message to the at least one recipient; and
    within a sent message corresponding to the message, cause the first collaborative UX to be automatically updated based on a change received to a second collaborative UX in a received message corresponding to the message.

12. The computer storage medium of claim 11, the computer-executable instructions when executed causing the at least one processor to:
    retrieve metadata associated with the identified collaborative UX; and
    based on the metadata, cause the first collaborative UX to be rendered in the message.

13. The computer storage medium of claim 11, wherein the change is not received in a reply to the message from the at least one recipient.

14. A system comprising:
    at least one processing unit; and
    at least one memory storing computer-executable instructions that, when executed by the at least one processor, cause the at least one processor to:
    determine a content type associated with a link received into a message being composed by a user;
    based on the content type, identify a collaborative user experience (UX) customized for the content type, the collaborative UX being an interface configured to enable interaction between the user and at least one recipient without navigating away from the message, the collaborative UX including one or more collaborative features customized for the content type and one or more functionalities customized for the content type;
    retrieve metadata associated with the identified collaborative UX;
    based on the metadata, cause a first collaborative UX to be rendered in the message, wherein the first collaborative UX includes content retrieved based on the link;
    receive an indication to send the message to the at least one recipient; and within a sent message corresponding to the message, cause the first collaborative UX to be automatically updated based on a change received to a second collaborative UX in a received message corresponding to the message.

15. The system of claim 14, wherein the computer-executable instructions when executed by the at least one processor, further cause the at least one processor to:

in response to identifying the collaborative UX, cause display of a selectable prompt indicating that the identified collaborative UX is available for dynamic collaboration regarding the content retrieved based on the link.

16. The system of claim 15, wherein the computer-executable instructions when executed by the at least one processor, further cause the at least one processor to:

receive selection of the selectable prompt; and in response to the selection, cause the first collaborative UX to be rendered in the message.

17. The system of claim 14, wherein the first collaborative UX is updated at substantially a same time as the change was received in the second collaborative UX.

18. The system of claim 14, wherein the metadata comprises a code pointer to custom code associated with the identified collaborative UX.

19. The system of claim 18, wherein the metadata comprises a load pointer to a code loader, and wherein the code loader is called to render the first collaborative UX.

20. The system of claim 14, wherein the computer-executable instructions when executed by the at least one processor, further cause the at least one processor to:

cause the first collaborative UX to be rendered in-line with text in the message.

* * * * *